US011938598B2

(12) United States Patent
Schneider et al.

(10) Patent No.: US 11,938,598 B2
(45) Date of Patent: Mar. 26, 2024

(54) POWER TOOL COMPONENT POSITION SENSING

(71) Applicant: MILWAUKEE ELECTRIC TOOL CORPORATION, Brookfield, WI (US)

(72) Inventors: Jacob P. Schneider, Cedarburg, WI (US); John S. Dey, IV, New York, NY (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/954,461

(22) Filed: Sep. 28, 2022

(65) Prior Publication Data

US 2023/0015954 A1 Jan. 19, 2023

Related U.S. Application Data

(63) Continuation of application No. 16/708,582, filed on Dec. 10, 2019, now Pat. No. 11,465,264.

(Continued)

(51) Int. Cl.
*B25B 23/00* (2006.01)
*B25B 21/02* (2006.01)

(Continued)

(52) U.S. Cl.
CPC ........ *B25B 23/1475* (2013.01); *B25B 21/023* (2013.01); *B25D 11/068* (2013.01); *B25F 5/00* (2013.01); *B25D 2250/221* (2013.01)

(58) Field of Classification Search
CPC .................................. B25B 1/02; B25B 1/008
See application file for complete search history.

(56) References Cited

U.S. PATENT DOCUMENTS

2009/0255699 A1 10/2009 Lehnert et al.
2012/0234566 A1 9/2012 Mashiko et al.

(Continued)

FOREIGN PATENT DOCUMENTS

JP 2015020243 A 2/2015
KR 20120065313 A 6/2012

OTHER PUBLICATIONS

International Search Report and Written Opinion for Application No. PCT/US2019/065334 dated May 8, 2020 (11 pages).

*Primary Examiner* — Eyamindae C Jallow
(74) *Attorney, Agent, or Firm* — Michael Best & Friedrich LLP

(57) ABSTRACT

Position sensing related to a component within a power tool. The component within the power tool is, for example, a hammer of an impact mechanism and can include one or more sensible features that allow a controller of the power tool to precisely determine the position, speed, and acceleration of the component. One or more sensors can be used to determine the rotational position of the hammer and the axial position of the hammer. The rotational position of the hammer can then be used to calculate, for example, rotational speed and acceleration of the hammer. With precise determinations of the rotational and axial position of the hammer, the controller of the power tool is able to precisely time the impact between the hammer and the anvil to optimize the impact between the hammer and the anvil (e.g., to maximize energy transfer between the hammer and the anvil).

20 Claims, 31 Drawing Sheets

Related U.S. Application Data

(60) Provisional application No. 62/777,963, filed on Dec. 11, 2018.

(51) Int. Cl.

| | |
|---|---|
| ***B25B 23/147*** | (2006.01) |
| ***B25D 11/06*** | (2006.01) |
| ***B25F 5/00*** | (2006.01) |

(56) References Cited

U.S. PATENT DOCUMENTS

| | | | | |
|---|---|---|---|---|
| 2013/0228353 | A1* | 9/2013 | Chen | B25B 21/008 173/176 |
| 2015/0133255 | A1 | 5/2015 | Atsumi et al. | |
| 2015/0165604 | A1* | 6/2015 | Bartoszek | B25B 21/02 173/1 |
| 2015/0196997 | A1 | 7/2015 | McClung | |
| 2016/0121467 | A1 | 5/2016 | Ng et al. | |
| 2017/0173768 | A1 | 6/2017 | Dey, IV et al. | |
| 2017/0246732 | A1 | 8/2017 | Dey, IV et al. | |
| 2018/0117745 | A1 | 5/2018 | Murakami et al. | |
| 2019/0030696 | A1* | 1/2019 | Seith | B25B 21/02 |

* cited by examiner

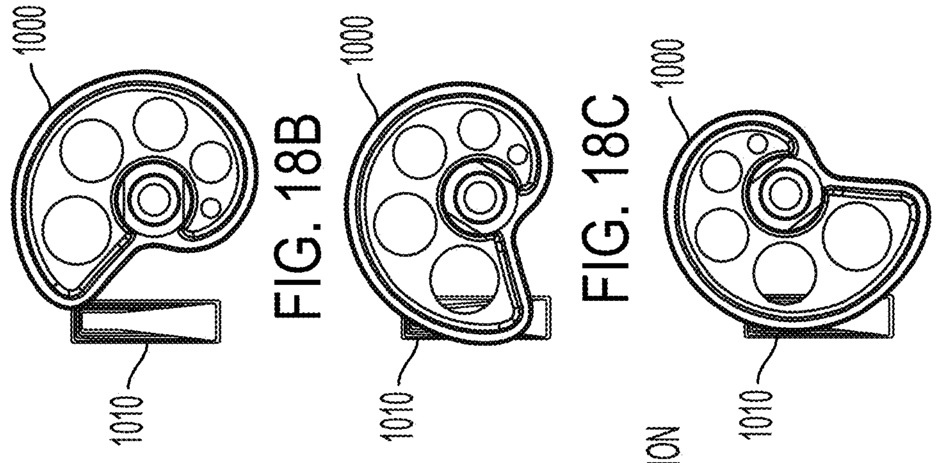
FIG. 18B
FIG. 18C
FIG. 18D
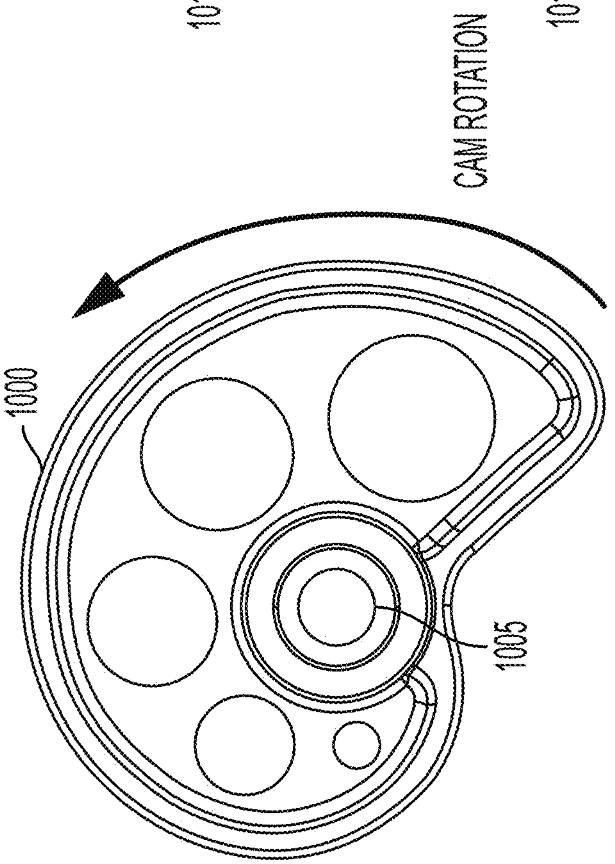
FIG. 18A

POWER TOOL COMPONENT POSITION SENSING

RELATED APPLICATIONS

This application is a continuation of U.S. patent application Ser. No. 16/708,582, filed Dec. 10, 2019, which claims the benefit of U.S. Provisional Patent Application No. 62/777,963, filed Dec. 11, 2018, the entire content of each of which is hereby incorporated by reference.

BACKGROUND

Embodiments described herein relate to sensing the position of a component within a power tool.

SUMMARY

Embodiments described herein provide improved techniques for sensing the position of a component within a power tool. For example, the component within the power tool can be a hammer of an impact mechanism, a spring associated with the hammer of the impact mechanism, a cam, a piston, a ram, etc. The component within the power tool can include one or more sensible features (i.e., features capable of being sensed) that allow a controller of the power tool to precisely determine the position, speed, and acceleration of the component. For example, a power tool can include an impact mechanism having a hammer and an anvil. One or more sensors can be used to determine the rotational position of the hammer and the axial position of the hammer. The rotational position of the hammer can then be used to calculate, for example, rotational speed and acceleration of the hammer. With precise determinations of the rotational and axial position of the hammer, a controller of the power tool is able to precisely time the impact between the hammer and the anvil to optimize the impact between the hammer and the anvil (e.g., to maximize energy transfer between the hammer and the anvil, better predict power tool output etc.). Additionally, precise determinations of the rotational and axial position of the hammer enable the calculation of the kinetic energy in the hammer before and after an impact event. The power tool can then be controlled based on the calculated kinetic energy in the hammer (e.g., modify motor speed, change motor direction, modify motor power, etc.)

With the controller of the power tool able to optimize the impact between the hammer and the anvil, the operation of the power tool can be improved. For example, hammer and anvil durability can be increased, vibrations generated by the power tool can be reduced, and the efficiency of the power tool can be increased. The durability of the hammer and the anvil can be increased with improved timing because the surface area of contact between the hammer and the anvil can be increased, which reduces contact stress on the hammer and the anvil. Reduced vibration of the power tool reduces the risk of, for example, screws loosening or motor wires breaking. Reduced vibration of the power tool can also improve user comfort when using the power tool. Increased efficiency of the power tool helps to maintain consistent and predictable current draw (e.g., from a battery pack) and can increase the torque output of the power tool.

Embodiments described herein provide a power tool that includes a motor, an impact mechanism, an impact case, a sensor, and a processing unit. The impact mechanism is coupled to the motor and includes a hammer and an anvil. The hammer is driven by the motor. The hammer includes a first sensible feature and a second sensible feature. The anvil is configured to receive an impact from the hammer. The impact case houses the anvil and the hammer. The sensor is configured to generate an output signal indicative of a rotational characteristic of the hammer by sensing the first sensible feature of the hammer and the second sensible feature of the hammer. The processing unit is connected to the sensor and to the motor. The processing unit is configured to control the motor based on the output signal from the sensor.

Embodiments described herein provide a method of controlling a motor of a power tool. The power tool includes an impact mechanism. The impact mechanism includes a hammer and an anvil. The method includes sensing a first sensible feature of the hammer using a sensor and generating an output signal from the sensor. The output signal has a first value related to the first sensible feature of the hammer. The method also includes sensing a second sensible feature of the hammer using the sensor and generating the output signal from the sensor. The output signal has a second value related to the second sensible feature of the hammer. The method also includes receiving the output signal at a processing unit and controlling the motor of the power tool based on the output signal having the first value related to the first sensible feature of the hammer and the second value related to the second sensible feature of the hammer.

Embodiments described herein provide a hammer of an impact mechanism for a power tool. The hammer includes a projection including a first sensible feature, a second sensible feature, and a third sensible feature.

Embodiments described herein provide a hammer of an impact mechanism for a power tool. The hammer includes a plurality of first sensible features and a plurality of second sensible features. The plurality of first sensible features are cutout portions of the hammer. The plurality of second sensible features are non-cutout portions of the hammer.

Embodiments described herein provide a power tool that includes a motor, an impact mechanism, an impact case, a sensor, and a processing unit. The impact mechanism is coupled to the motor. The impact mechanism includes a hammer, an anvil, and a spring. The hammer is driven by the motor. The hammer includes a first sensible feature and a second sensible feature. The anvil is configured to receive an impact from the hammer. The spring is configured to axially bias the hammer to engage the anvil. The impact case houses the anvil, the hammer, and the spring. The sensor is configured to generate an output signal indicative of a compression of the spring. The processing unit is connected to the sensor and to the motor. The processing unit is configured to control the motor based on the output signal from sensor.

Embodiments described herein provide a method of controlling a motor of a power tool. The power tool includes an impact mechanism. The impact mechanism includes a hammer, an anvil, and a spring. The method includes sensing, with a sensor, a compression of the spring, generating an output signal from the sensor indicative of the compression of the spring, receiving the output signal at a processing unit, and controlling, using the processing unit, the motor of the power tool based on the output signal indicative of the compression of the spring.

Embodiments described herein provide a power tool that includes a motor, a cam, a sensor configured to generate an output signal indicative of a rotational position of the cam, and a processing unit connected to the sensor and to the motor. The processing unit is configured to control the motor based on the output signal from the sensor.

Embodiments described herein provide a method of controlling a motor of a power tool. The power tool includes a cam and a sensor. The method includes sensing, with a sensor, a rotational position of the cam, generating an output signal from the sensor indicative of the rotational position of the cam, receiving the output signal at a processing unit, and controlling, using the processing unit, the motor of the power tool based on the output signal indicative of the rotational position of the cam.

Embodiments described herein provide a method of controlling a motor of a power tool. The power tool includes an impact mechanism. The impact mechanism includes a hammer and an anvil. The method includes driving the motor based on a selected operational mode and trigger pull, detecting a position of the hammer using a sensor, optimizing an impact between the hammer and the anvil based on the position of the hammer, detecting the impact between the hammer and the anvil, incrementing an action counter after detecting the impact between the hammer and the anvil, determining whether the action counter is greater than or equal to an action threshold, and changing, when the action counter is greater than or equal to the action threshold, operation of the motor.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIG. 18A illustrates a rotatable cam.

FIGS. 18B, 18C, and 18D illustrate the cam of FIG. 18A and a sensor for detecting rotation of the cam according to various embodiments described herein.

DETAILED DESCRIPTION

Embodiments described herein relate to a power tool that includes one or more sensors for detecting the position of a component within the power tool. The component within the power tool can be, for example, a hammer of an impact mechanism, a spring associated with the hammer of the impact mechanism, a cam, a piston, a ram, etc. The one or more sensors include one or more inductive sensors, one or more magnetic sensors, a combination of inductive and magnetic sensors, or the like. The one or more sensors are used to detect a position of the component in order to control the operation of the power tool. In some embodiments, the power tool is controlled based on, for example, a rebound coefficient of the hammer, a number of impacts between a hammer and anvil of an impact mechanism, etc. The component within the power tool can include one or more sensible features that allow a controller of the power tool to precisely determine the position, speed, and acceleration of the component. For example, in some embodiments, the component is hammer of an impact mechanism. The hammer is configured such that it includes a first sensible feature, a second sensible feature, and a third sensible feature. The sensible features are sensed by one or more sensors and the controller of the power tool uses output signals from the one or more sensors to precisely determine a rotational position, a speed, and an acceleration of the hammer.

The position of the hammer can be a rotational or angular position of the hammer, or the position of the hammer can be an axial position of the hammer. In some embodiments, sensors are used to determine both the rotational position of the hammer and the axial position of the hammer. With precise determinations of the rotational and axial positions of the hammer, the controller of the power tool is able to precisely time the impact between the hammer and the anvil to optimize the impact between the hammer and the anvil (e.g., to maximize energy transfer between the hammer and the anvil). With the controller of the power tool able to optimize the impact between the hammer and the anvil, the operation of the power tool can be improved. For example, hammer and anvil durability can be increased, vibrations generated by the power tool can be reduced, the efficiency of the power tool can be increased, and torque output of the power tool can be more precisely controlled.

Figure 1:
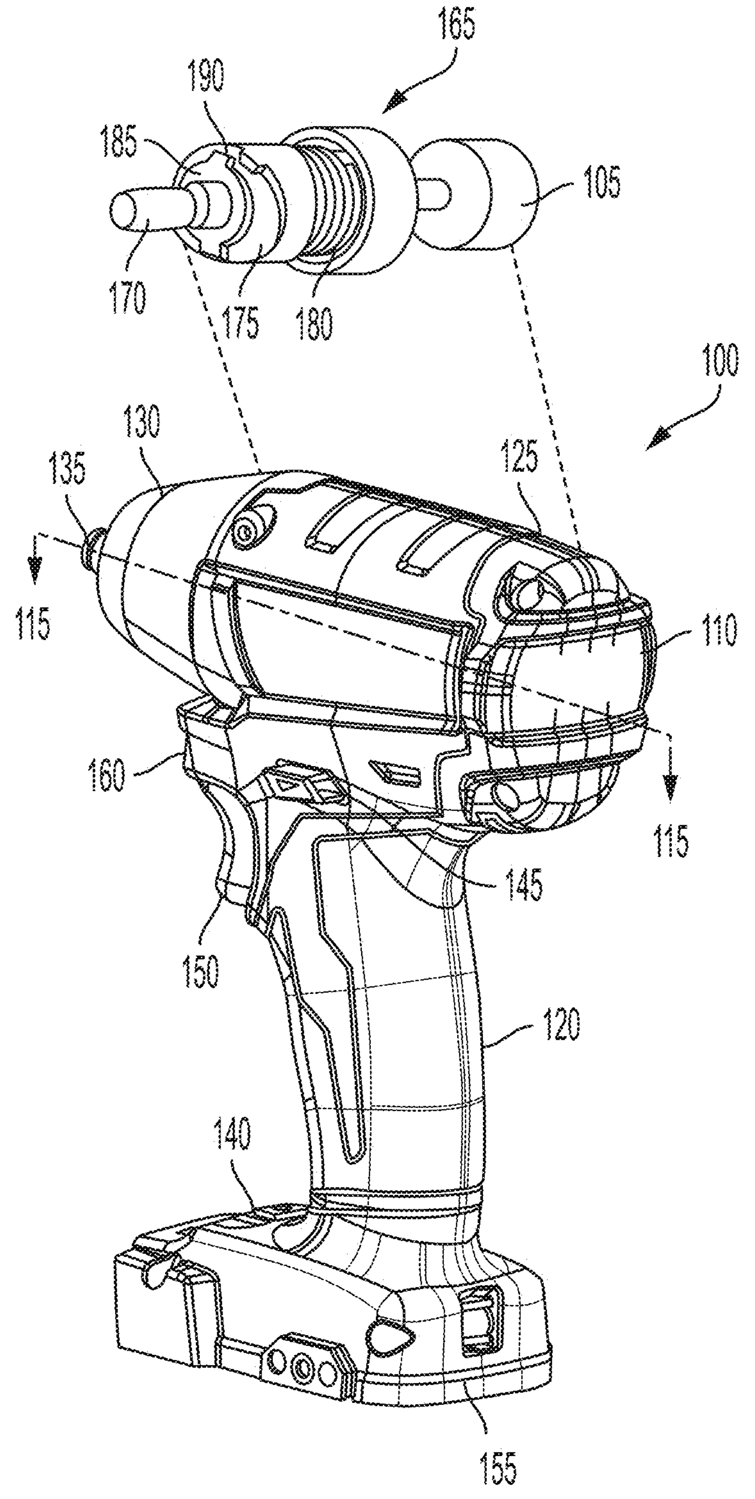
FIG. 1 illustrates a power tool according to one embodiment of the invention.

FIG. 1 illustrates a power tool 100 including a brushless direct current ("BLDC") motor 105. In a brushless motor power tool, such as power tool 100, switching elements are selectively enabled and disabled by control signals from a controller to selectively apply power from a power source (e.g., battery pack) to drive (e.g., control) a brushless motor. In some embodiments, the power tool 100 is a brushless impact wrench having a housing 110 with a central axis 115, a handle portion 120, and a motor housing portion 125. The motor housing portion 125 is mechanically coupled to an impact case 130 that houses an output unit 135. The impact case 130 forms a nose of the power tool 100, and can be made from a different material than the housing 110. For example, the impact case 130 may be metal, while the housing 110 may be plastic. The power tool 100 further includes a mode select button 140, forward/reverse selector 145, trigger 150, battery interface 155, and light 160. Although the power tool 100 illustrated in FIG. 1 is an impact wrench, the power tool 100 can also be a different type of tool, such as, for example, a hammer drill, an impact hole saw, an impact driver, and the like.

The power tool 100 also includes an impact mechanism 165 including an anvil 170, and a hammer 175. The impact mechanism 165 is positioned within the impact case 130 and is mechanically coupled to the motor 105 via a transmission 195 (see FIG. 3). The transmission 195 may include, for example, gears or other mechanisms to transfer the rotational power from the motor 105 to the impact mechanism 165, and in particular, to the hammer 175. The hammer 175 is axially biased to engage the anvil 170 via a spring 180. The hammer 175 impacts the anvil 170 periodically to increase the amount of torque delivered by the power tool 100 (e.g., the anvil 170 drives the output unit 135). The anvil 170 includes an engagement structure 185 that is rotationally fixed with portions of the anvil 170. The engagement structure 185 includes a plurality of protrusions 190 (e.g., two protrusions in the illustrated embodiment) to engage the hammer 175 and receive the impact from the hammer 175. During an impacting event or cycle, as the motor 105 continues to rotate, the power tool 100 encounters a higher resistance and winds up the spring 180 coupled to the hammer 175. As the spring 180 compresses, the spring 180 retracts toward the motor 105, pulling along the hammer 175 until the hammer 175 disengages from the anvil 170 and surges forward to strike and re-engage the anvil 170. An impact refers to the event in which the spring 180 releases and the hammer 175 strikes the anvil 170. The impacts increase the amount of torque delivered by the anvil 170.

Figure 2:
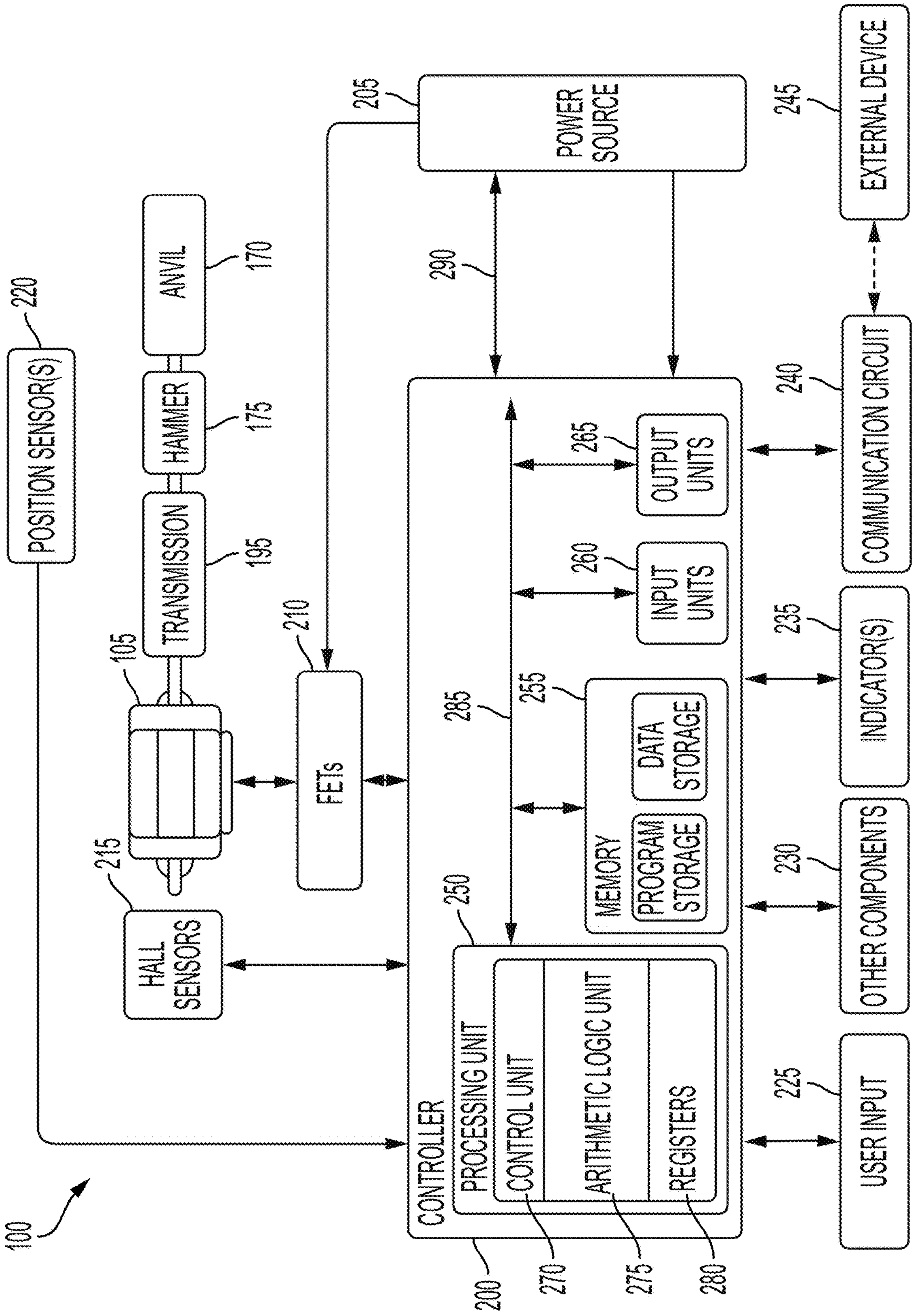
FIG. 2 is a block diagram of the power tool of FIG. 1.

FIG. 2 illustrates an electromechanical diagram of the brushless power tool 100, which includes a controller 200. The controller 200 is electrically and/or communicatively connected to a variety of modules or components of the power tool 100. For example, the illustrated controller 200 is connected to a power source 205, Field Effect Transistors ("FETs") 210, the motor 105, Hall Effect sensors 215 (also referred to as Hall sensors), one or more position sensors 220, a user input 225, other components 230 (e.g., a battery pack fuel gauge, work lights [e.g., LEDs], current/voltage sensors, etc.), one or more indicators 235 (e.g., LEDs), and a communication circuit 240 (e.g., a transceiver or a wired interface) configured to communicate with an external device 245 (e.g., a smartphone, a tablet computer, a laptop computer, and the like). The communication circuit 240 and its communication with the external device 245 is described in greater detail in, for example, U.S. Patent Application Publication No. 2017/0246732, published on Aug. 31, 2017 and entitled "POWER TOOL INCLUDING AN OUTPUT POSITION SENSOR," the entire content of which is hereby incorporated by reference.

The controller 200 includes combinations of hardware and software that are operable to, among other things, control the operation of the power tool 100, detect linear and/or rotational positions associated with the impact mechanism 165, control power provided to the motor 105, etc. In some embodiments, the controller 200 includes a plurality of electrical and electronic components that provide power, operational control, and protection to the components and modules within the controller 200 and/or power tool 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture (e.g., a modified Harvard architecture, a von Neumann architecture, etc.). The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein.

The memory 255 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the power tool 100 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control of the power tool 100 described herein. In other constructions, the controller 200 includes additional, fewer, or different components.

The power source 205 provides DC power to the various components of the power tool 100. In some embodiments, the power source 205 is a power tool battery pack that is rechargeable and uses, for example, lithium ion battery cell technology. In other embodiments, the power source 205 may receive AC power (e.g., 120V/60 Hz) from a tool plug that is coupled to a standard wall outlet, and then filter, condition, and rectify the received power to output DC power. In some embodiments, the power tool 100 includes, for example, a communication line 290 for providing a communication line or link between the controller 200 and the power source 205.

Each of the Hall sensors 215 outputs motor feedback information, such as an indication (e.g., a pulse) related to when a magnet of the motor 105's rotor rotates across the face of that Hall sensor 215. Based on the motor feedback information from the Hall sensors 215, the controller 200 is able to directly determine the rotational position, speed, and acceleration of the rotor. In addition to the direct measurement of the rotor position, the Hall sensors 215 can provide indirect information regarding the position of the anvil 170. The one or more position sensors 220 output information regarding the position of, for example, the anvil 170, the hammer 175, the spring 180, etc.

The power tool 100 is configured to operate in various modes. For example, the controller 200 receives user controls from user input 225, such as by selecting an operating mode with the mode select button 140, shifting the forward/reverse selector 145, or depressing the trigger 150. In response to the motor feedback information and user controls, the controller 200 generates control signals to control the FETs 210 to drive the motor 105. By selectively enabling and disabling the FETs 210, power from the power source 205 is selectively applied to stator coils of the motor 105 to cause rotation of the motor 105's rotor. Although not shown explicitly, the one or more position sensors 220 and other components of the power tool 100 are electrically coupled to the power source 205 such that the power source 205 provides power to those components.

In some embodiments, controller 200 also controls other aspects of the power tool 100 such as, for example, operation of the work light 160 and/or the fuel gauge, recording usage data, communication with an external device, and the like. In some embodiments, the power tool 100 is configured to control the operation of the motor based on the number of impacts executed by the hammer portion of the power tool 100. For example, in some embodiments, the controller 200 is configured to monitor a change in position, speed, and/or acceleration associated with the impact mechanism 165 to detect the number of impacts executed by the power tool 100. The controller 200 can then control the motor 105 based on the detected number of impacts. By monitoring the impact mechanism 165 directly, the controller 200 can effectively control, for example, the number of impacts over the entire range of the tool's battery charge and motor speeds (i.e., regardless of the battery charge or the motor speed).

Figure 3:
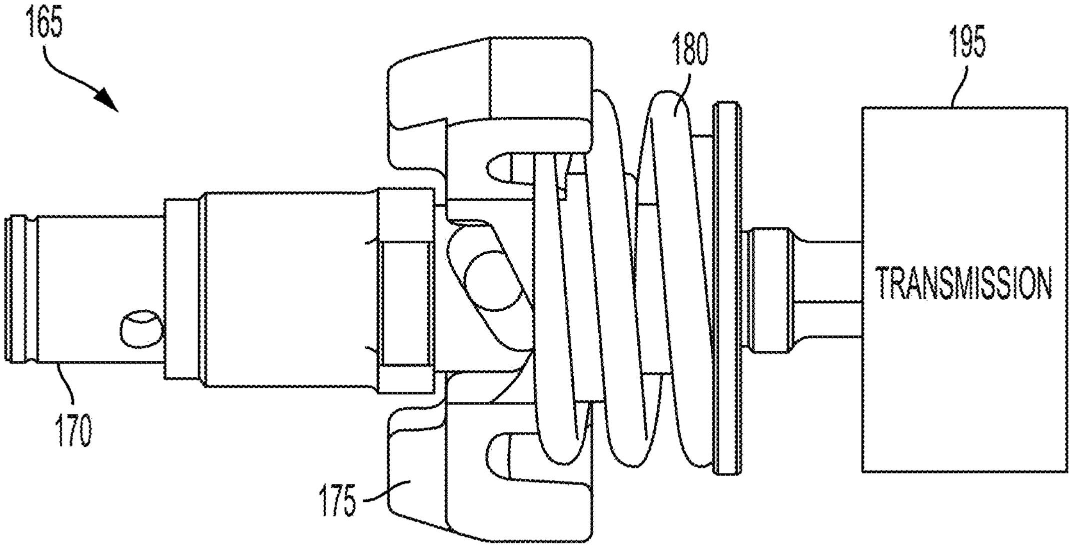
FIG. 3 is a side view of an isolated impact mechanism of the power tool of FIG. 1.

FIG. 3 is an isolated side view of the impact mechanism 165 coupled to the transmission 195 for driving the impact mechanism 165. The one or more position sensors 220 can be associated with the various portions of the impact mechanism 165 to detect one or more characteristics or attributes of the impact mechanism 165. The characteristics of the impact mechanism include, for example, linear position of the hammer 175, linear position of the spring 180 (e.g., a compression state of the spring 180), rotational position of the hammer 175, direction of rotation of the hammer 175, etc. In some embodiments, characteristics of other components of a power tool can be detected, such as, for example, a rotational position of a cam.

In some embodiments, the one or more position sensors 220 include one or more inductive sensors configured to generate an electromagnetic field and detect the presence (or proximity) of an object based on changes in the detected electromagnetic field. In other embodiments, the position sensor(s) 220 include one or more magnetic sensors configured to detect a varying magnetic field. The one or more magnetic sensors can include, for example, a Hall-Effect sensor, a magnetoresistive sensor, or another sensor configured to detect a magnetic vector. In some embodiments, the one or more magnetic sensors include an anisotropic magneto-resistive ("AMR") sensor. The use of a single type of sensor (e.g., inductive sensor, magnetic sensor, etc.) is not required. For example, a combination of magnetic and inductive sensors could be used to achieve the desired level of detection and monitoring related to the impact mechanism 165 or another component of the power tool 100, As an illustrative example, one or more inductive sensors can be used to detect a rotational position associated with the impact mechanism 165 and one or more magnetic sensors can be used to detect a linear position associated with the impact mechanism 165. Alternatively, one or more magnetic sensors can be used to detect a rotational position associated with the impact mechanism 165 and one or more inductive sensors can be used to detect a linear position associated with the impact mechanism 165. Regardless of the specific combination of sensors used to achieve the desired level of detection and monitoring related to the impact mechanism 165, embodiments described herein provide for improved techniques for accurately and precisely detecting and monitoring movements associated with the impact mechanism 165.

Figure 4A:
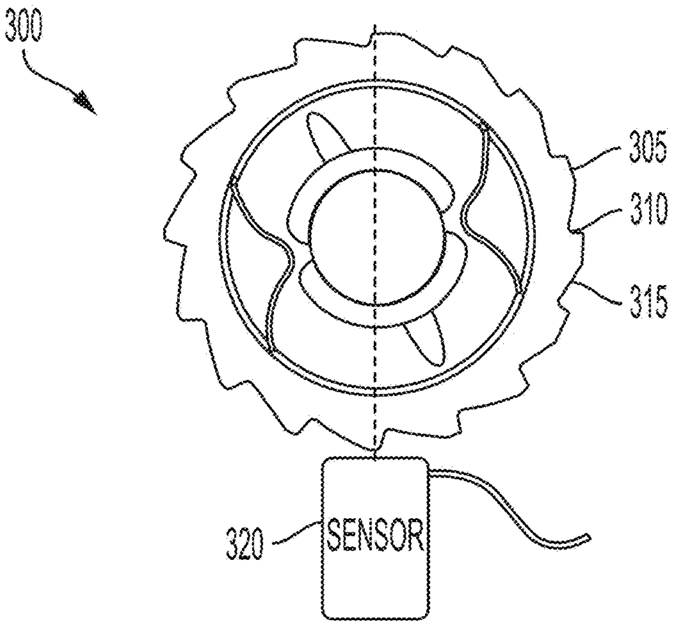
FIG. 4A illustrates a hammer including a plurality of features sensible by a sensor according to various embodiments described herein.

FIG. 4A is a front-facing view of a hammer 300 that includes a first sensible feature 305, a second sensible feature 310, and a third sensible feature 315. The sensible features 305, 310, and 315 correspond to a plurality of teeth or projections positioned around an outer or circumferential portion of the hammer 300. The shape of the projections allow a sensor 320 to detect, among other things, a rotational direction of the hammer 300, a rotational or angular position of the hammer 300, and a type of operation being performed by the hammer 300 (e.g., fastening, loosening, etc.). As indicated previously, the sensor 320 can be, for example, an inductive sensor, a magnetic sensor, or the like. As illustrated in FIG. 4A, each of the sensible features 305, 310, and 315 can be varied depending on the location of the associated projection around the circumferential portion of the hammer 300. For example, each projection on the hammer 300 includes a first sensible feature 305, a second sensible feature 310, and a third sensible feature 315 that differs in size from the other projections on the hammer 300. In the embodiment illustrated in FIG. 4A, the first sensible feature corresponds to a flat outer or circumferential surface of a projection. The length of the flat circumferential surface varies (i.e., is shorter or longer) depending on the particular projection. The second sensible feature corresponds to a height of a projection. The height of the projection similarly varies (i.e., is taller or shorter) depending on the particular projection. The third sensible feature 315 corresponds to a ramp between adjacent projections. Depending on the location of the projection along the circumferential portion of the hammer 300 and, for example, the height of the projection, the ramp can vary in length (i.e., shorter for shorter projections and gradually increasing in length as the height of the projection increases).

Figure 4B:
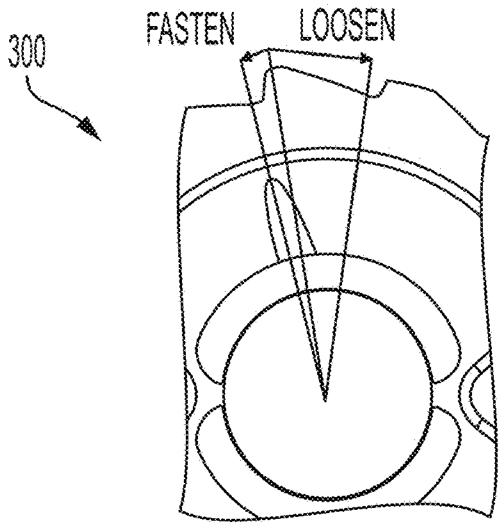
FIG. 4B illustrates the plurality of sensible features of the hammer of FIG. 4A.
Figure 4C:
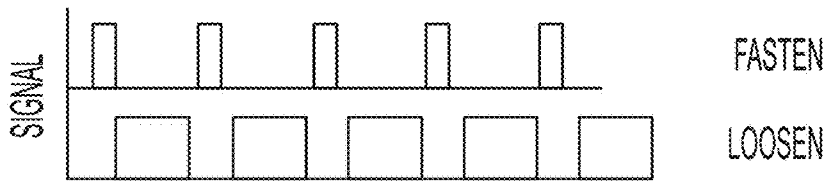
FIG. 4C illustrates sensor output signal waveforms related to a fastening operation and a loosening operation.

Based on the output signal or signals from the sensor 320 that are generated as the hammer 300 rotates (e.g., positive voltages, negative voltages, no voltage, a voltage above a limit, etc.), the rotational position, speed, and acceleration of the hammer 300 can be determined with precision. Additionally, as illustrated in FIG. 4B, different sensible features can be detected based on the type of operation that is being performed. For example, the sensor 320 sensing the second sensible feature 310 indicates that a fastening operation is being performed. The sensor 320 sensing the third sensible feature 315 can indicate that a loosening operation is being performed. As illustrated in FIG. 4C, output signals from the sensor 320 can vary in value based on which sensible feature is being detected by the sensor 320. Additionally, as the sensible feature being sensed changes (i.e., becomes larger or smaller), a particular location on the circumferential portion of the hammer 300 or a particular projection can be identified (e.g., an absolute rotational position). In some embodiments, the precision with which the sensor 320 and controller 200 are able to determine the precise rotational position of the hammer 300 depends on the number of projections that are located around the circumferential portion of the hammer 300. In the embodiment illustrated in FIG. 4A, the hammer 300 includes sixteen projections, which allows the controller 200 to detect the rotational position of the hammer 300 with a rotational precision of approximately 22.5°. The number of projections included in the hammer 300 is, for example, dictated by a desired precision for the detection of the rotational motion of the hammer 300. As a result, in other embodiments, the hammer 300 can include more or fewer projections.

When a plurality of position measurements for the hammer 300 are analyzed over time, other measurements related to the hammer 300 can be derived (e.g., speed, acceleration, etc.). Therefore, the sensor 320 provides direct information that the controller 200 uses to determine the position, speed, and/or acceleration of the hammer 300. The controller 200 detects the rotation of the hammer 300 when the hammer 300 is in proximity to the anvil 170 (e.g., moments before the hammer 300 impacts the anvil 170 and moments after the hammer 300 impacts the anvil 170).

By detecting the rotation of the hammer 300, for example, moments before and moments after impacting the anvil 170, the controller 200 can determine a rebound coefficient for the impact mechanism 165. The rebound coefficient is the ratio of the rotational or angular speed of the hammer 300 moments after the impact between the hammer 300 and the anvil 170 over the rotational or angular speed of the hammer 300 moments before the impact. The rebound coefficient is related to an amount of impact energy that the hammer 300 transfers to the anvil 170. Higher rebound coefficients (e.g., 0.5) generally correspond to higher impact energies than lower rebound coefficients (e.g., 0.1). Based on the calculated rebound coefficient, the controller 200 can adjust or optimize the timing of the impact between the hammer 300 and the anvil 170. For example, the controller 200 can modify the rotational speed of the hammer 300 by modifying the rotational speed of the motor 105. The controller 200 is configured to modify the rotational speed of the hammer 300 (i.e., increase or decrease speed) such that the hammer 300 reaches a maximum rotational speed immediately before the hammer 300 impacts the anvil 170. The controller 200 is configured to modify the rotational speed of the hammer 300 to compensate for, among other things, power source (e.g., battery pack) impedance, power source voltage, joint condition (e.g., soft joint, hard joint, gasketed joint, etc.).

Figure 4D:
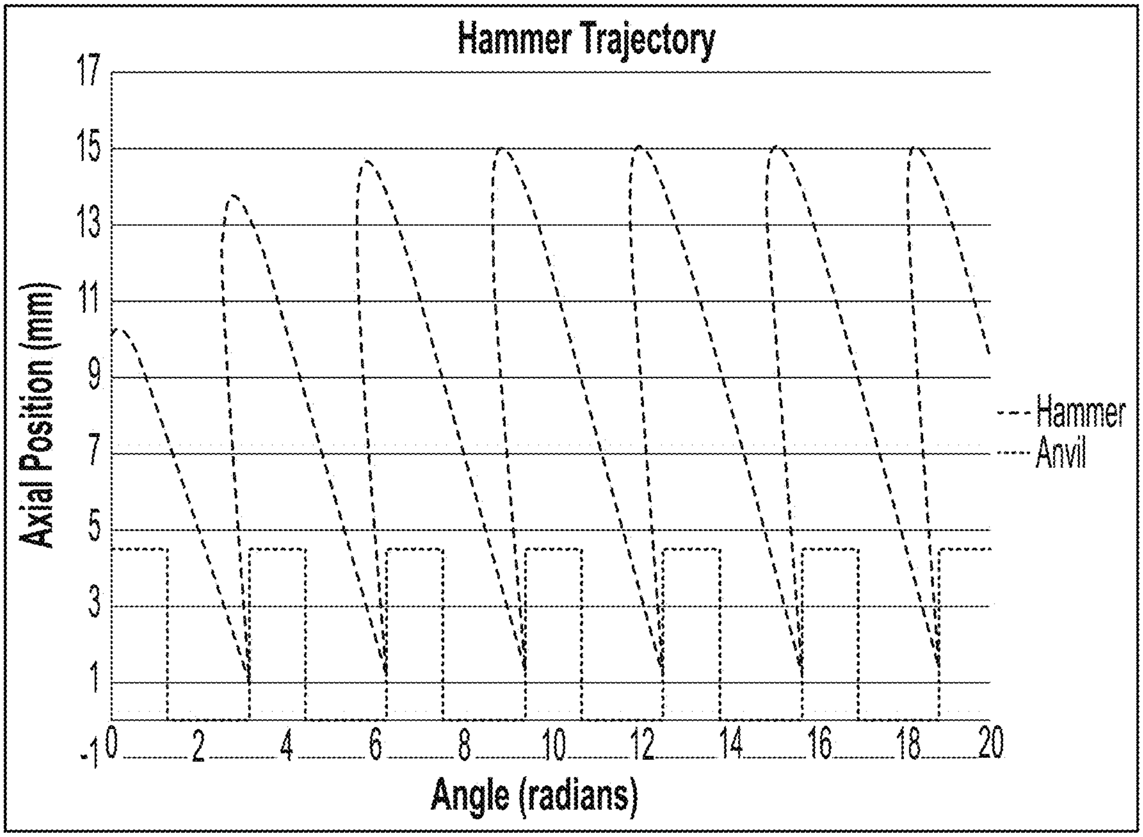
FIGS. 4D and 4E illustrate a timing diagram and a torque-speed curve for a power tool being powered by a battery pack having an expected battery pack impedance.
Figure 4E:
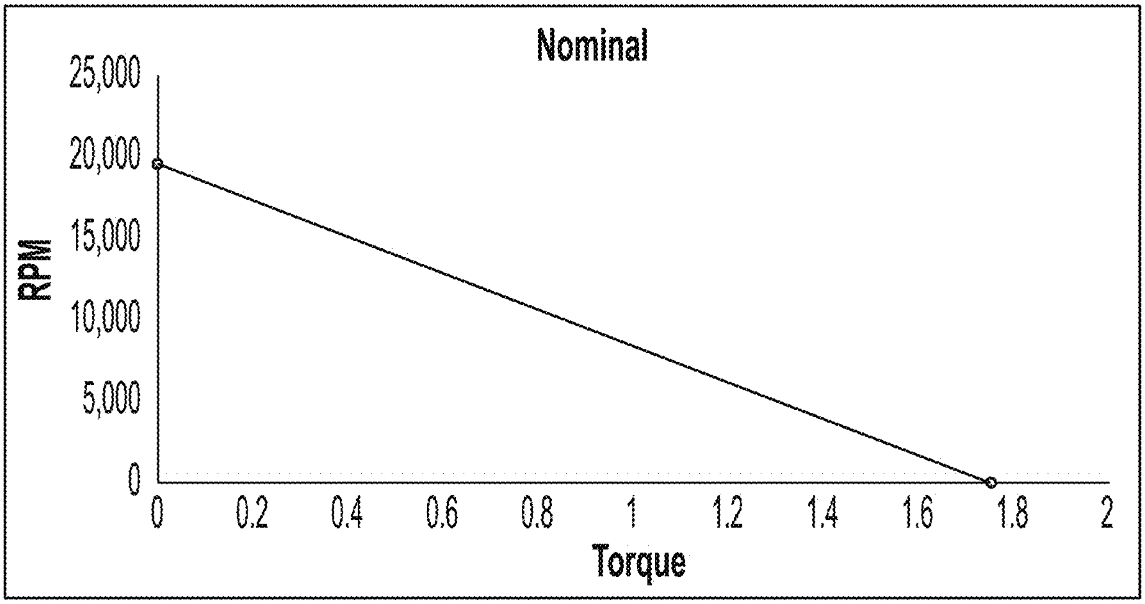
Figure 4F:
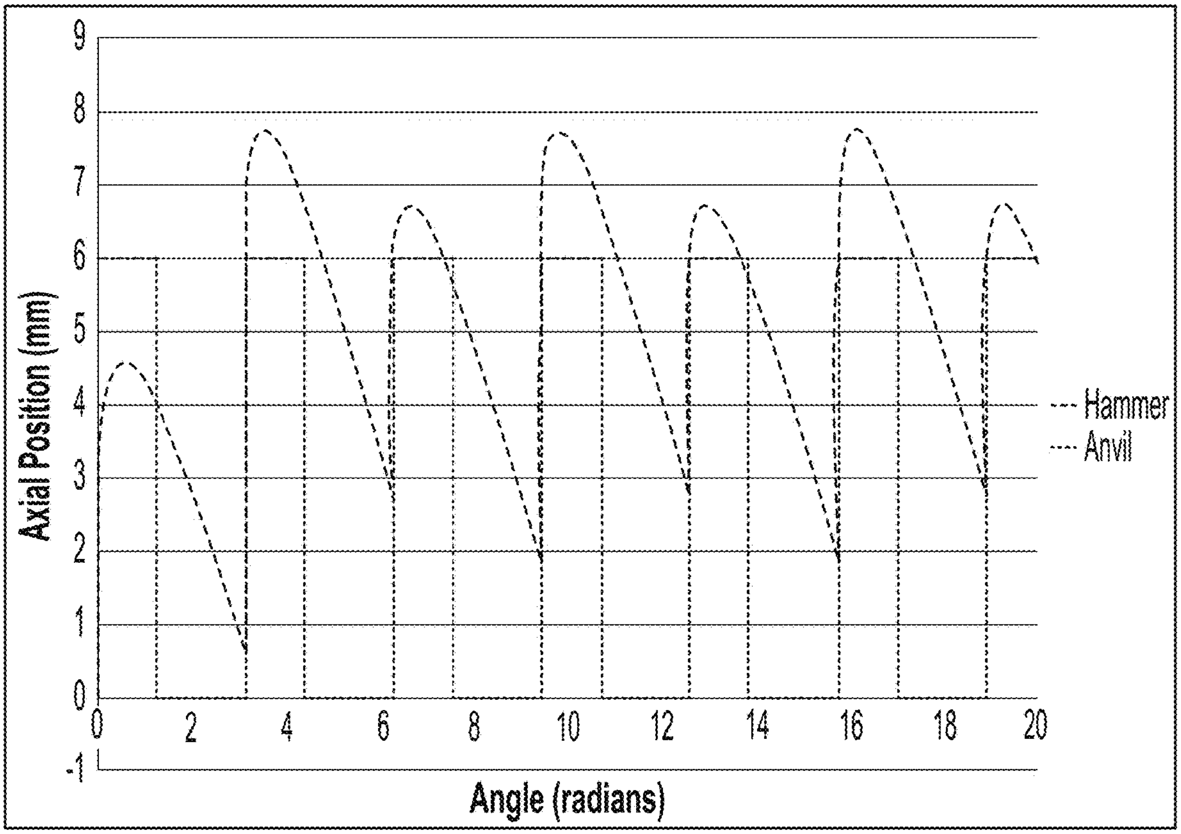
FIGS. 4F and 4G illustrate a timing diagram and a torque-speed curve for a power tool being powered by a battery pack having a higher than expected battery pack impedance.
Figure 4G:
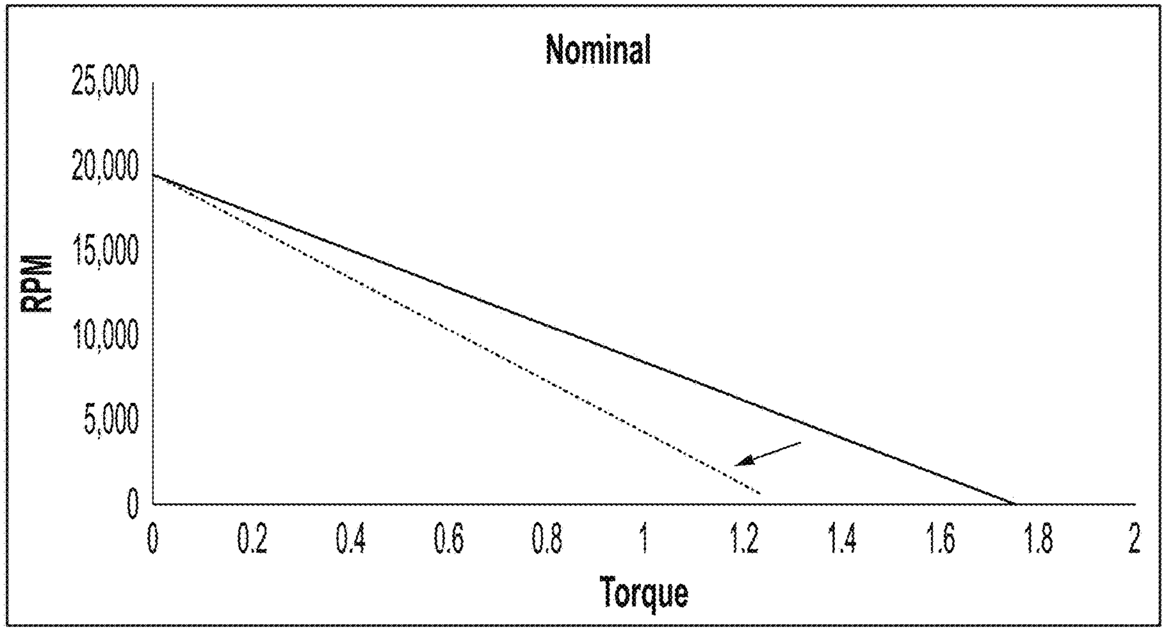
Figure 4H:
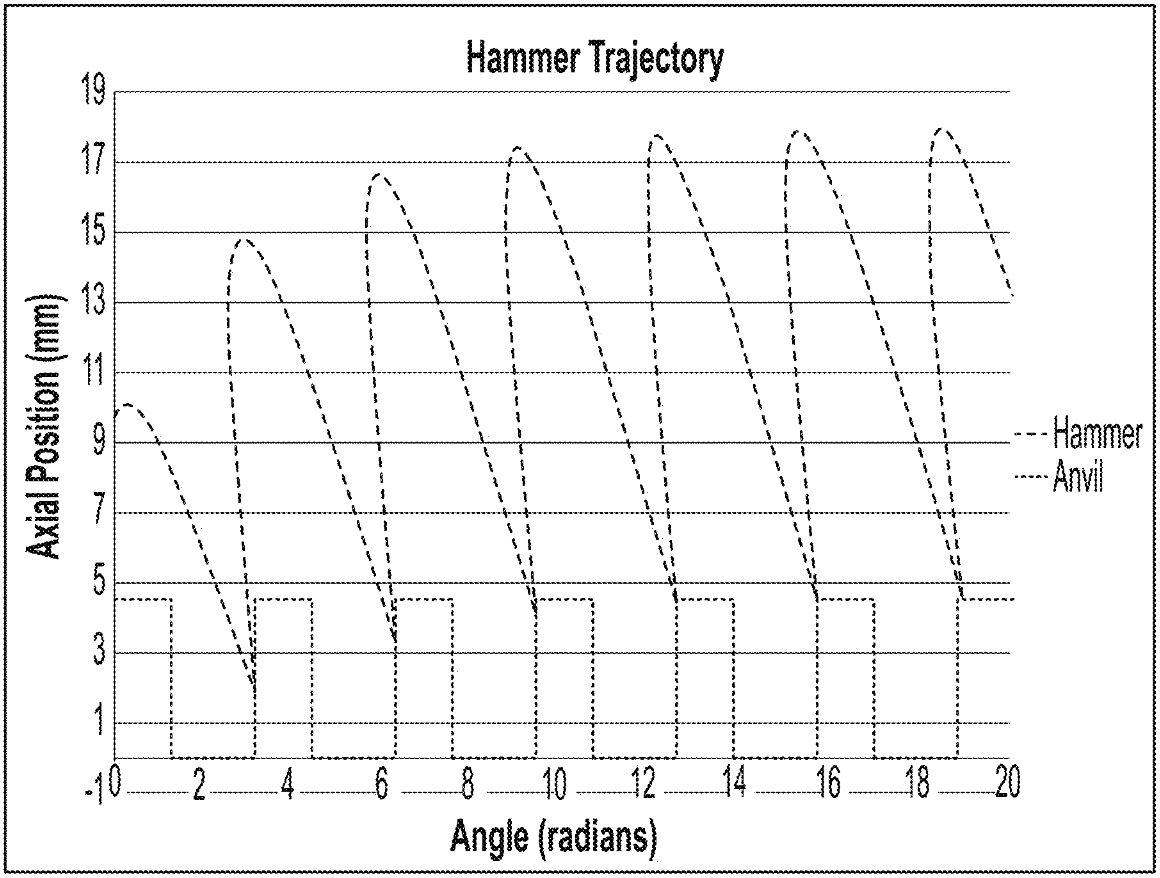
FIGS. 4H and 4I illustrate a timing diagram and a torque-speed curve for a power tool being powered by a battery pack having a lower than expected battery pack impedance.
Figure 4I:
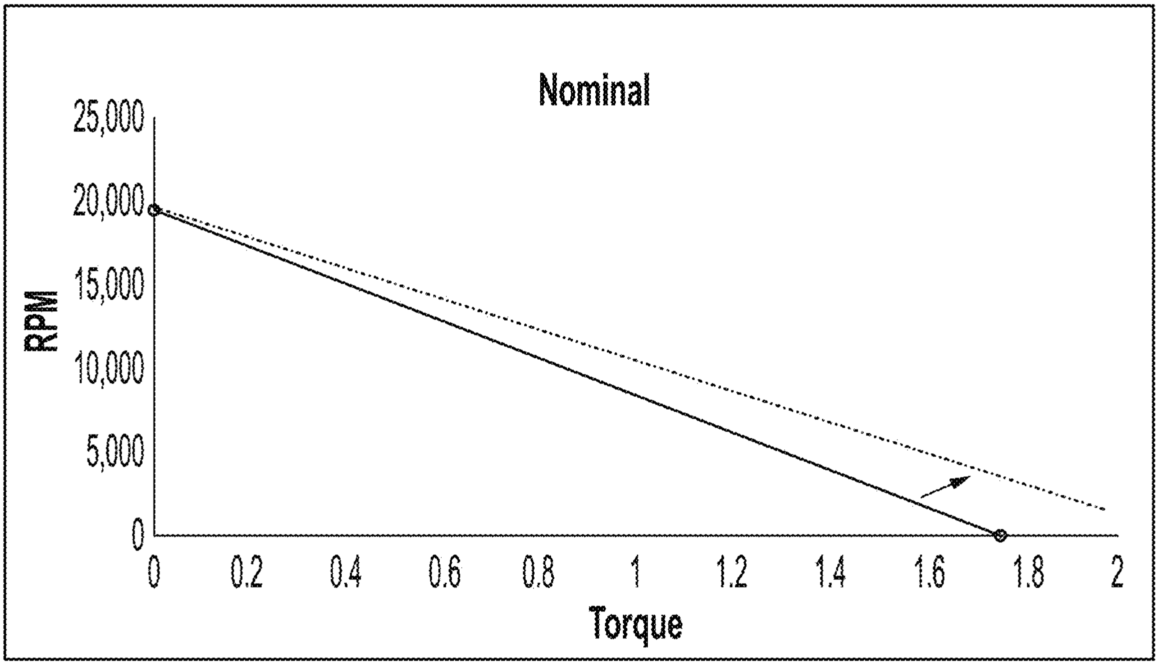

For example, the power tool 100 may be designed in view of a particular battery pack, and that battery pack has a particular impedance. When the power tool 100 is powered using this battery pack, the rotational speed and torque generated by the motor 105 is as expected and the impact between the hammer 300 and the anvil 170 is timed correctly (see FIGS. 4D and 4E). However, a battery pack impedance that is too high compared to the battery pack for which the power tool 100 was designed can result in unexpectedly low torques and rotational speeds for the motor 105 (see FIGS. 4F and 4G). As a result of the higher impedance, the timing of the impact between the hammer 300 and the anvil 170 is off and the speed of the motor 105 should be adjusted (e.g., increased) to compensate for the battery pack's impedance. Similarly, a battery pack impedance that is too low compared to the battery pack for which the power tool 100 was designed can result in unexpectedly high torques and rotational speeds for the motor 105 (see FIGS. 4H and 4I). As a result of the lower impedance, the timing of the impact between the hammer 300 and the anvil 170 is again off and the speed of the motor 105 should be adjusted (e.g., decreased) to compensate for the impedance. The lower impedance can also cause damage by chipping or spooning of the hammer 300 or anvil 170. The controller 200 can be configured to determine the impedance of a battery pack to which the power tool 100 is connected (e.g., by sensing the battery pack's impedance, receiving the battery pack impedance from the battery pack, etc.). By optimizing the timing of the impact between the hammer 300 and the anvil 170, the controller 200 can improve the durability of the hammer 300 and anvil 170, reduce vibrations produced by the power tool 100, and increase the efficiency of the power tool.

Figure 5A:
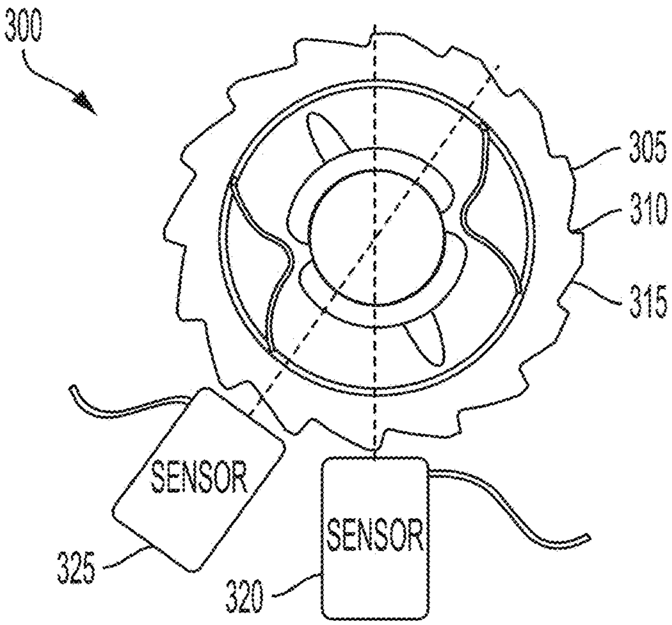
FIG. 5A illustrates the hammer of FIG. 4A including the plurality of features sensible by a plurality of sensors.
Figure 5B:
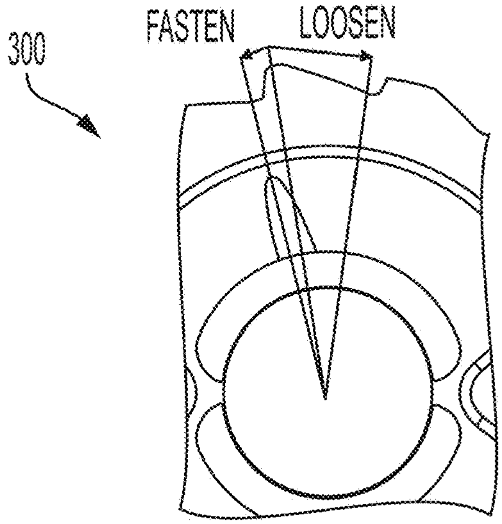
FIG. 5B illustrates the plurality of sensible features of the hammer of FIG. 5A.
Figure 5C:
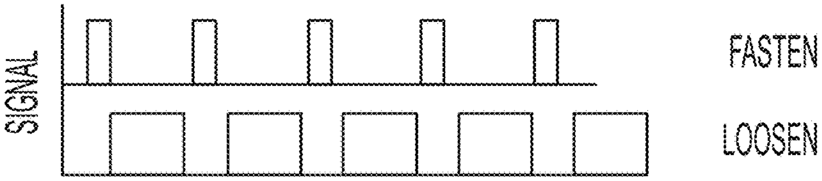
FIG. 5C illustrates sensor output signal waveforms related to a fastening operation and a loosening operation.

FIGS. 5A, 5B, and 5C illustrate the hammer 300 described above with respect to FIGS. 4A, 4B, and 4C. The embodiment of the hammer 300 in FIG. 5A differs from the embodiment of the hammer 300 in FIG. 4A because a second sensor 325 or plurality of sensors is included for sensing the sensible features 305, 310, and 315 of the hammer 300. The second sensor 325 can be, for example, an inductive sensor, a magnetic sensor, or the like. By adding a second sensor 325, the controller 200 is able to use the output signals from the first sensor 320 and the second sensor 325 to, for example, more precisely determine the rotational position of the hammer 300. In some embodiments, the controller 200 is configured to compare the output signals from the sensor 320 and the output signals from the sensor 325. Comparing the output signals and the differences between the signals allows the controller 200 to, for example, detect the rotational position of the hammer 300 with more precision.

Figure 6A:
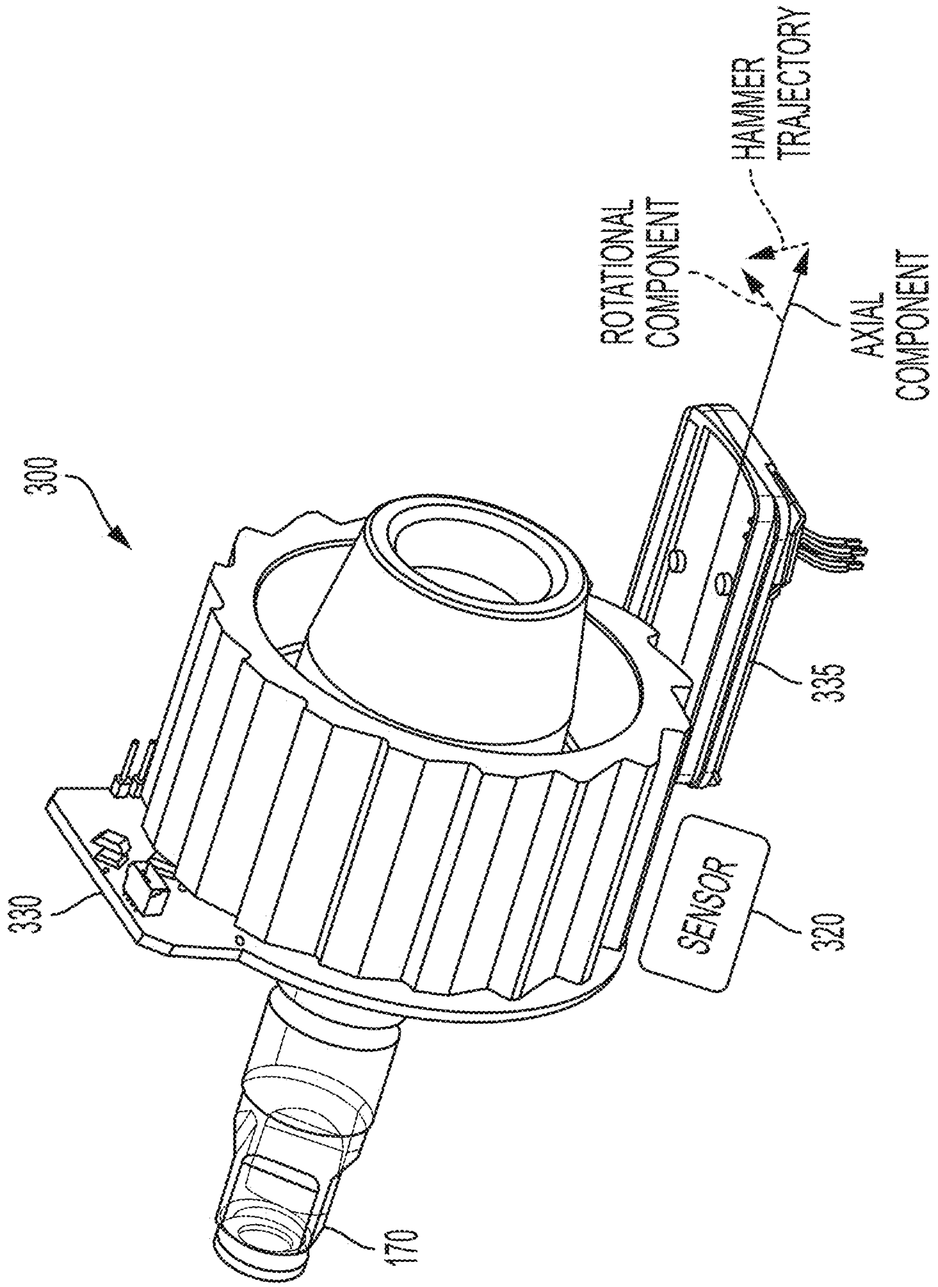
FIG. 6A is a perspective view of the hammer of FIG. 4A including the plurality of sensible features.

The hammer 300 from FIGS. 4A and 5A is illustrated in FIG. 6A in a perspective view in relation to a printed circuit board ("PCB") 330 and the anvil 170. In the embodiment illustrated in FIG. 6A, the PCB 330 can include one or more sensors (e.g., inductive sensors) for detecting the rotational position of the anvil 170. As previously described, the sensor 320 is configured to generate output signals that allow the controller 200 to determine the rotational or angular position of the hammer 300. The embodiment illustrated in FIG. 6A also includes an additional sensor or sensor tray 335. The sensor 335 is configured to detect an axial position of the hammer 300. For example, as the hammer 300 rotates, the hammer 300 is displaced in the axial direction (e.g., away from the anvil 170 and then toward the anvil 170) to impact the anvil 170. The sensor 320 detects the rotational component of the hammer 300's motion, and the sensor 335 detects the axial component of the hammer 300's motion. Based on the output signals from the sensors used to detect the hammer 300's motion, the controller 200 can determine, for example, a trajectory of the hammer 300. The trajectory of the hammer 300 can then be used by the controller 200 to determine when an impact occurs based on both the axial and rotational components of the hammer 300's motion. In some embodiments, the PCB 330 includes a sensor for sensing the axial displacement of the hammer 300.

Figure 6B:
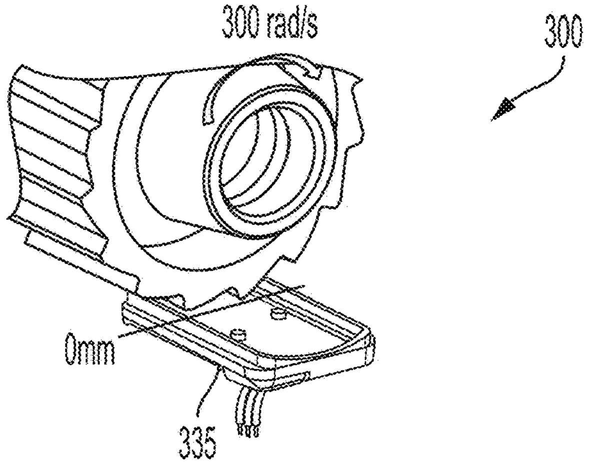
FIG. 6B illustrates the hammer of FIG. 4A at a first rotational and axial position.
Figure 6C:
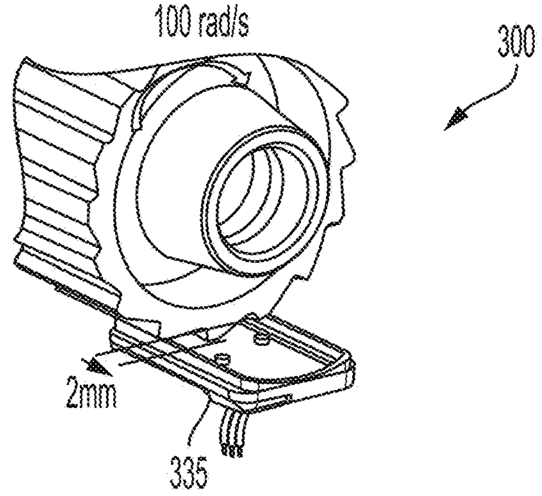
FIG. 6C illustrates the hammer of FIG. 4A at a second rotational and axial position.
Figure 6D:
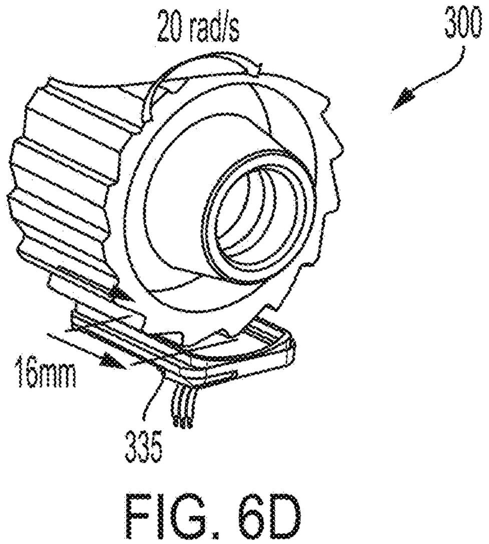
FIG. 6D illustrates the hammer of FIG. 4A at a third rotational and axial position.

The motion of the hammer 300 is illustrated in greater detail with respect to FIGS. 6B, 6C, and 6D. FIG. 6B illustrates the axial position of the hammer 300 for a corresponding rotational speed of 300 radians/second. FIG. 6B corresponds, for example, to the hammer 300 being at the moment of impact with the anvil 170. FIG. 6C corresponds to the hammer 300 traveling away from the anvil 170 in advance of another anvil strike. The rotational motion of the hammer 300 slows to 100 radians/second and the hammer 300 is displaced axially by, for example, 3 millimeters. FIG. 6D corresponds to the hammer 300 being positioned at its farthest distance from the anvil 170, with a rotational speed of 20 radians/second, and an axial displacement of approximately 16 millimeters. The rotational speed of the hammer 300 can be determined by the controller 200 based on a series of positional measurements of the sensible features 305, 310, and 315 using the sensor(s) 320, 325. As an illustrative example, the controller 200 can then use the determined rotational speed and measured axial displacement of the hammer 300 to determine where the hammer is in an impacting process, as well as count a number of impacts between the hammer 300 and the anvil 170.

Figure 7A:
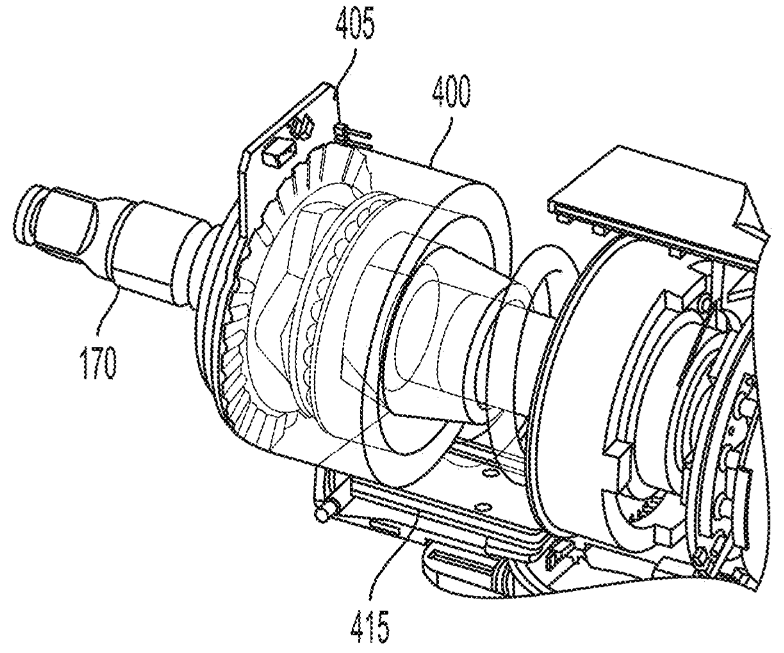
FIGS. 7A, 7B, 7C, and 7D illustrate a hammer including features sensible by a sensor according to various embodiments described herein.
Figure 7B:
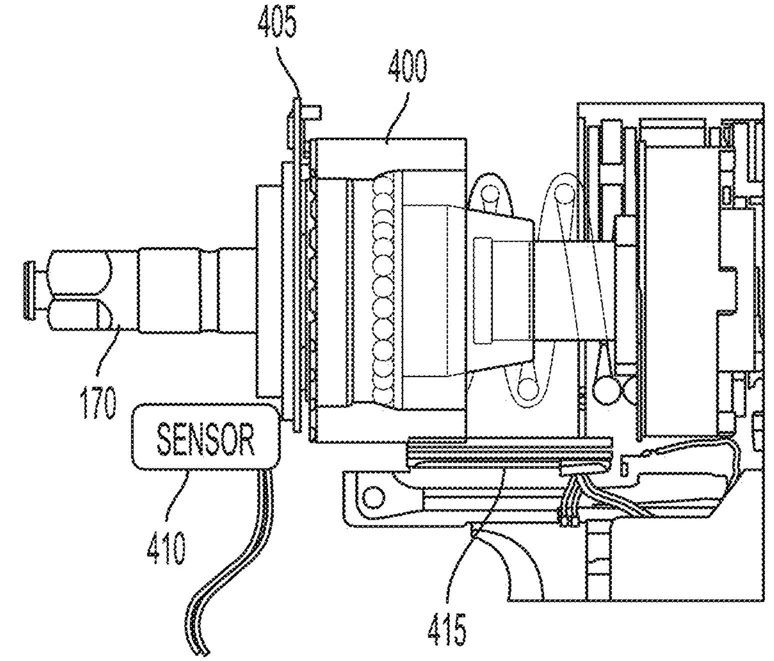

FIGS. 7A, 7B, 7C, and 7D illustrate another embodiment of a hammer 400. As shown in FIGS. 7A and 7B, the hammer 400 is associated with a PCB 405 and the anvil 170. The anvil 170 includes anvil protrusions 450, and the hammer 400 includes a hammer protrusions 455 for engaging the anvil protrusions 450. The PCB 405 can include one or more sensors (e.g., inductive sensors, magnetic sensors, etc.) for detecting the rotational position of the anvil 170. As illustrated in FIG. 7B, the rotational and/or axial position of the hammer 400 can be detected using the sensor 410. The sensor 410 can be, for example, an inductive sensor, a magnetic sensor, etc. A sensor or sensor tray 415 can also be configured to detect an axial position of the hammer 300. In some embodiments, the PCB 405 also includes a sensor for sensing the axial displacement of the hammer 400.

Figure 7C:
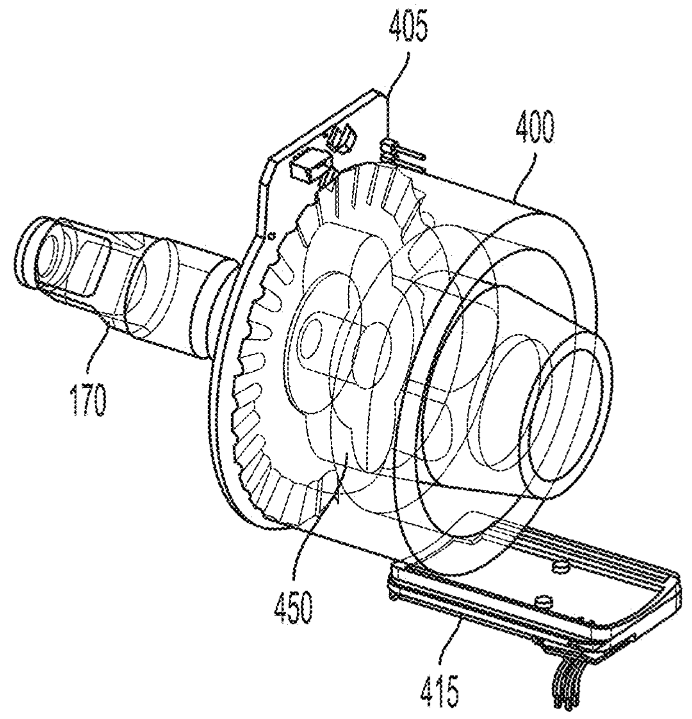
Figure 7D:
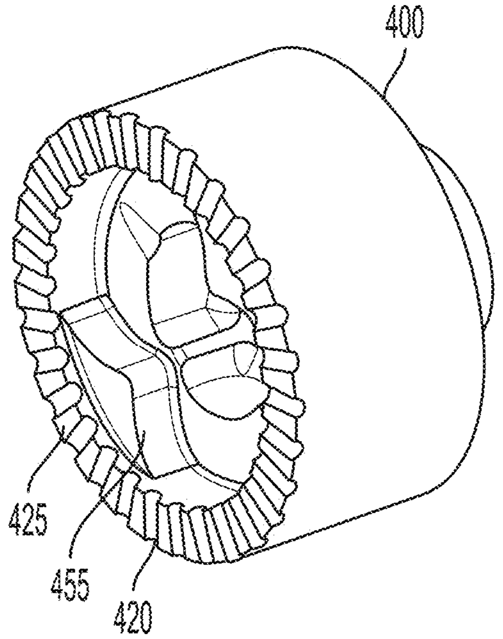

The hammer 400 is illustrated in greater detail in FIGS. 7C and 7D. As shown in FIGS. 7C and 7D, the hammer 400 includes a plurality of sensible features 420. In the embodiment illustrated in FIGS. 7C and 7D, the sensible features 420 correspond to cutouts in a body of the hammer 400. As a result, the sensible features 420, when sensed by a sensor (e.g., sensor 410), cause the sensor to output a different signal than is output when the sensor senses a non-cutout portion 425 of the hammer 400. Unlike the hammer 300 illustrated and described with respect to FIGS. 4A-6D, the sensible features 420 of the hammer 400 are generally uniform in nature. The uniform sensible features 420 of the hammer 400 provide, for example, a greater level of precision position detection than the sensible features of the hammer 300. The hammer 400 illustrated in FIG. 7D includes thirty sensible features 420 and non-cutout portions 425, which allows the controller 200 detect the rotational position of the hammer 300 with a rotational precision of approximately 12°. Although the hammer 400 includes thirty sensible features 420 and thirty non-cutout portions 425, the hammer 400 can be manufactured to include any desirable number of sensible features 420. The number of sensible features 420 included in the hammer 400 is, for example, dictated by a desired precision for the detection of the rotational motion of the hammer 400. As a result, in other embodiments, the hammer 400 can include more or fewer of sensible features 420 and more or fewer non-cutout portions 425.

Figure 8B:
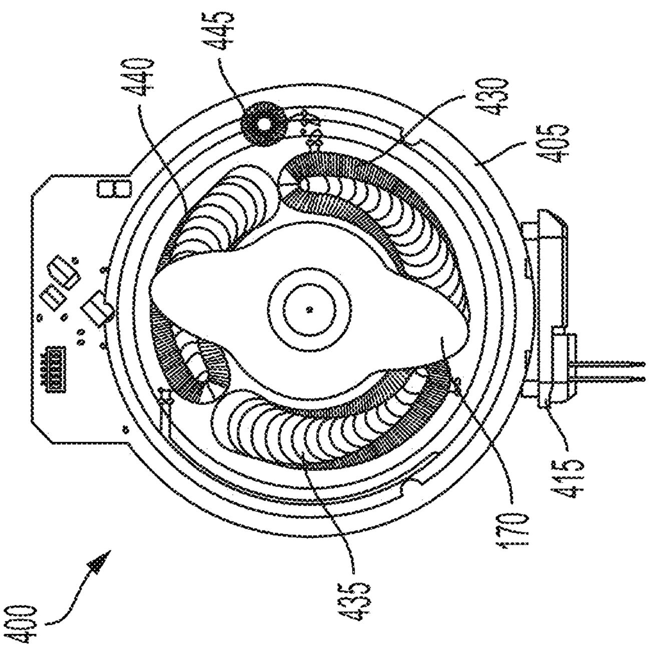
FIG. 8B illustrates a plurality of sensors for sensing anvil rotation.
Figure 8A:
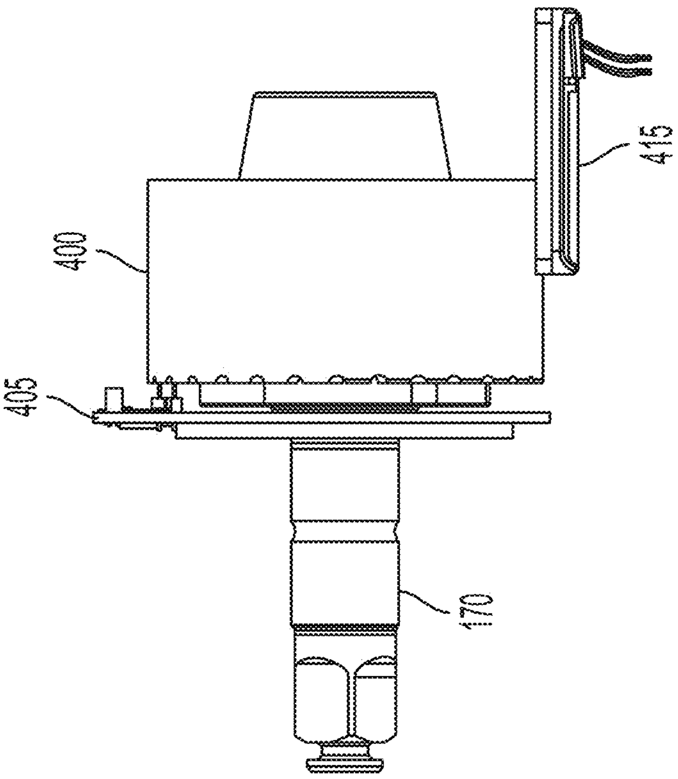
FIG. 8A illustrates a hammer in a first axial position with respect to an anvil.
Figure 9B:
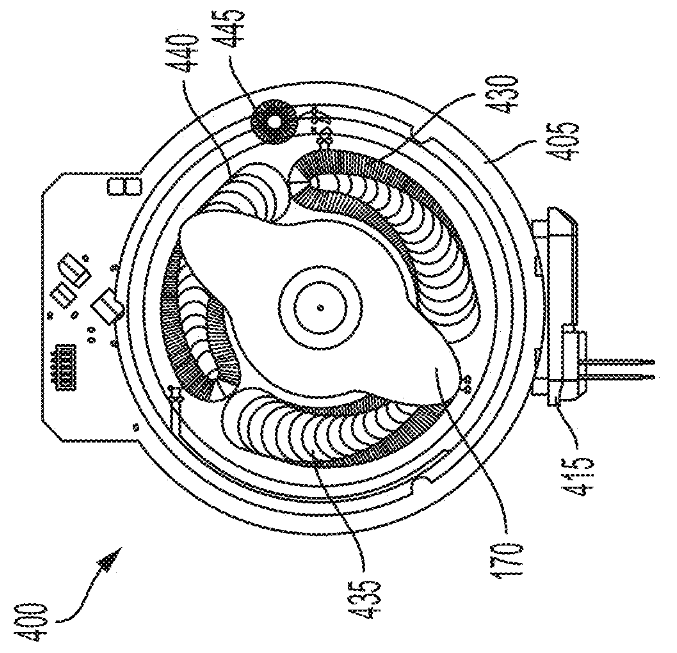
FIG. 9B illustrates a plurality of sensors for sensing anvil rotation.
Figure 9A:
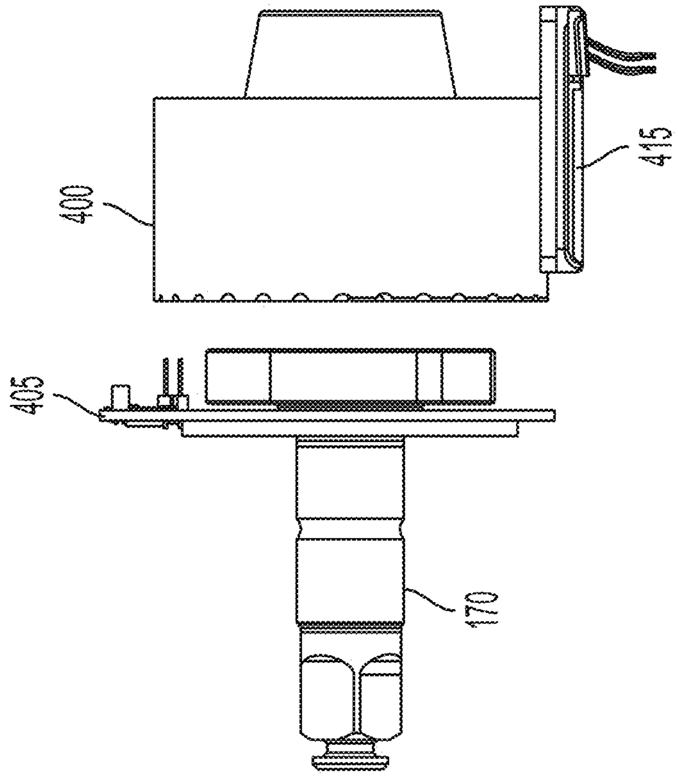
FIG. 9A illustrates a hammer in a second axial position with respect to an anvil.

The axial and rotational motion of the hammer 400 is illustrated with respect to FIGS. 8A, 8B, 9A, and 9B. As shown in FIG. 8A, the hammer 400 is located in proximity to the anvil 170 (i.e., to impact the anvil 170) and the PCB 405. As shown in FIG. 8B, the PCB 405 includes a first inductive sensor 430, a second inductive sensor 435, a third inductive sensor 440, and a fourth inductive sensor 445. The sensors 430, 435, 440 and 445 are configured for detecting a rotation of the anvil 170. The rotation of the anvil 170 is measured using the sensors 430, 435, 440, and 445 when the hammer 400 has rebounded away from the anvil 170. For example, the sensor 445 is configured to detect the proximity of the hammer 400 to the anvil 170. When the hammer 400 is within a predetermined distance from the anvil 170, the controller 200 does not read or ignores the output signals from the sensors 430, 435, and 440. When the hammer 400 is outside of the predetermined distance from the anvil 170, the controller 200 detects the rotation of the anvil 170 based on the output signals from the sensors 430, 435, and 440. Accordingly, when the hammer 400 is in proximity to the anvil 170 and PCB 405, as illustrated in FIG. 8A, the controller 200 does not determine the rotation of the anvil 170. As shown in FIG. 9A, however, the hammer 400 has rebounded away from the anvil 170 and the PCB 405 such that the controller 200 will not detect the rotation of the anvil 170 using the sensors 430, 435, and 440. The amount of rotation of the anvil 170 corresponds, for example, to an amount of work that the anvil 170 performs.

Unlike the detection of the rotation of the anvil 170, the rotation of the hammer 400 is detected when the hammer 400 is in proximity to the anvil 170 and the PCB 405 (e.g., moments before the hammer 400 impacts the anvil 170 and moments after the hammer 400 impacts the anvil 170). For example, with reference to FIG. 8A, the controller 200 detects the rotation of the hammer 400 because the hammer 400 is in proximity to the anvil 170. The controller 200 does not detect the rotation of the hammer 400 in FIG. 9A because the hammer 400 has rebounded away from the anvil 170.

By detecting the rotation of the hammer 400, for example, moments before and moments after impacting the anvil 170, the controller 200 can determine the rebound coefficient for the impact mechanism 165. The rebound coefficient is the ratio of the rotational or angular speed of the hammer 400 moments after the impact between the hammer 400 and the anvil 170 over the rotational or angular speed of the hammer 400 moments before the impact. The rebound coefficient is related to an amount of impact energy that the hammer 400 transfers to the anvil 170. Higher rebound coefficients (e.g., 0.5) generally correspond to higher impact energies than lower rebound coefficients (e.g., 0.1). Based on the calculated rebound coefficient, the controller 200 can adjust or optimize the timing of the impact between the hammer 400 and the anvil 170. For example, the controller 200 can modify the rotational speed of the hammer 400 by modifying the rotational speed of the motor 105. The controller 200 is configured to modify the rotational speed of the hammer 400 (i.e., increase or decrease speed) such that the hammer 400 reaches a maximum rotational speed immediately before the hammer 400 impacts the anvil 170. The controller 200 is configured to modify the rotational speed of the hammer 400 to compensate for, among other things, power source (e.g., battery pack) impedance, power source voltage, joint condition (e.g., soft joint, hard joint, gasketed joint, etc.). By optimizing the timing of the impact between the hammer 400 and the anvil 170, the controller 200 can improve the durability of the hammer 400 and anvil 170, reduce vibrations produced by the power tool 100, and increase the efficiency of the power tool.

Figure 10A:
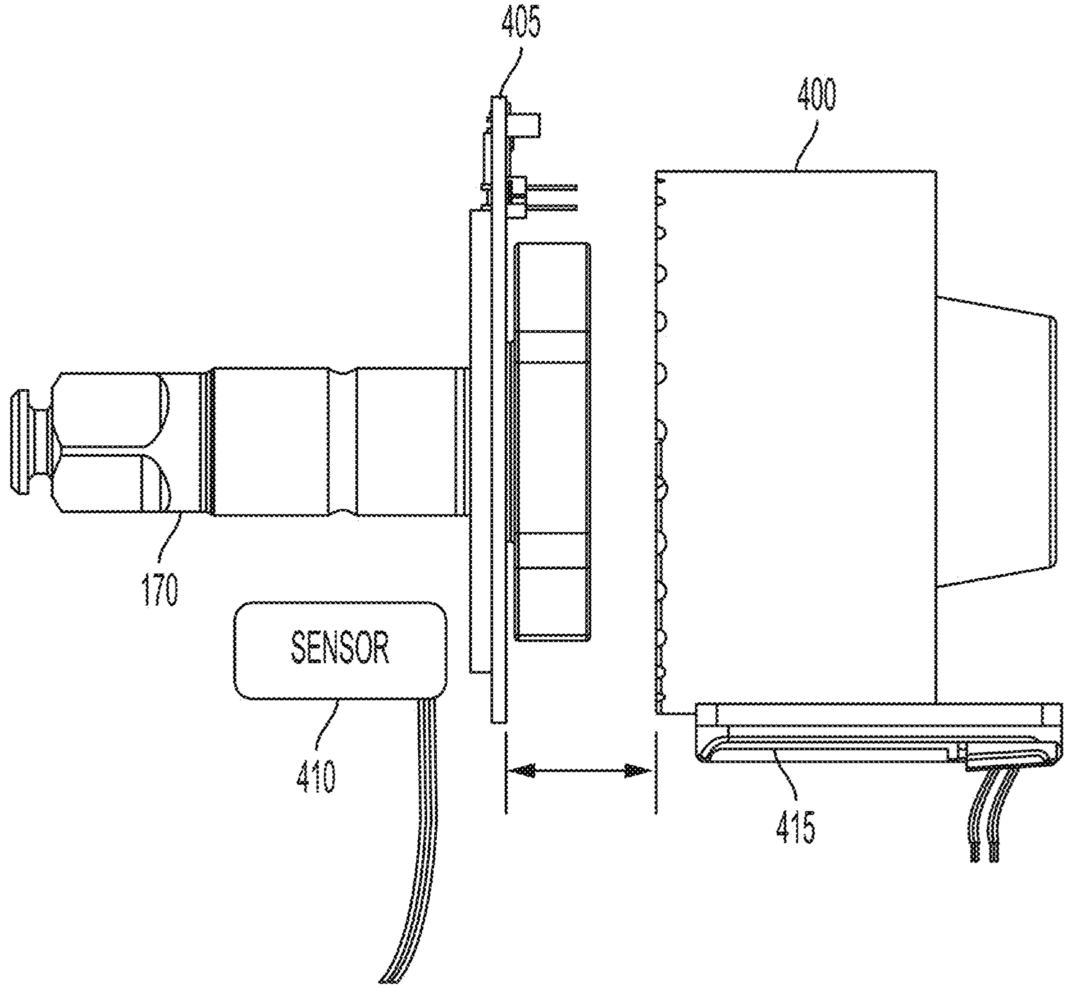
FIG. 10A illustrates a hammer at a first position and including features sensible by a sensor according to various embodiments described herein.
Figure 10B:
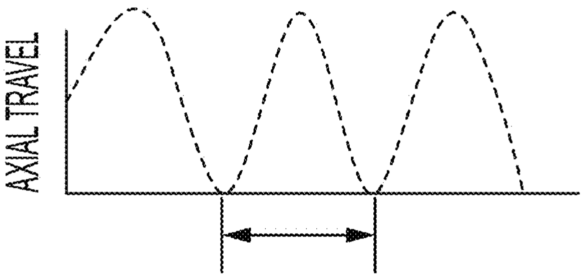
FIG. 10B illustrates a sensor signal output waveform related to axial motion of the hammer of FIG. 10A.
Figure 10C:
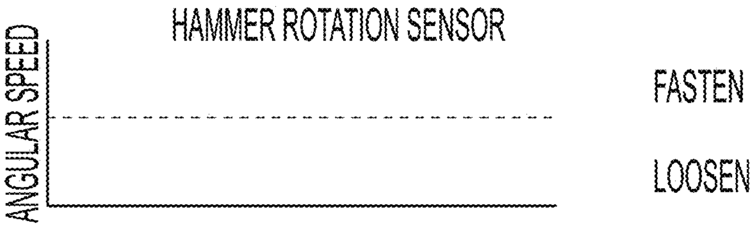
FIG. 10C illustrates sensor signal output waveforms related to a fastening operation and a loosening operation of the hammer of FIG. 10A.
Figure 11A:
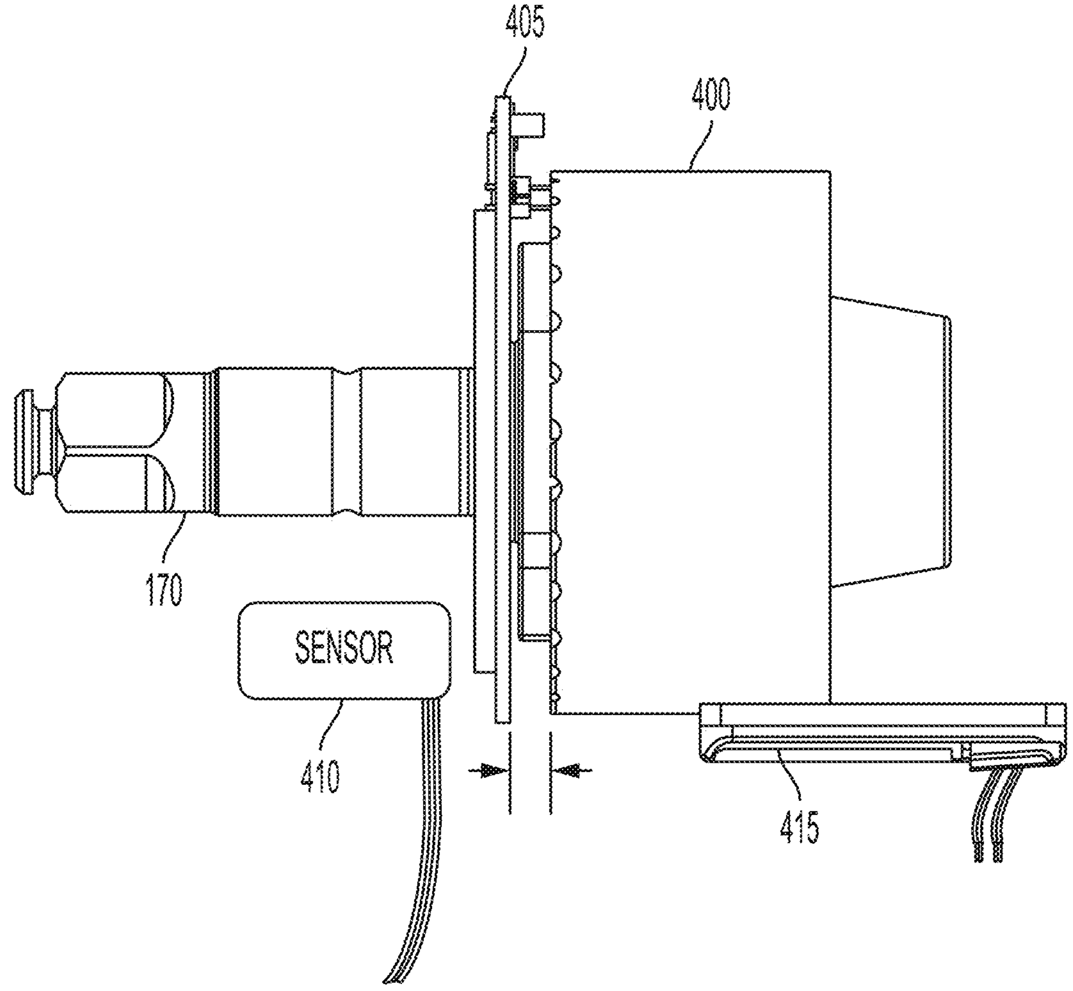
FIG. 11A illustrates a hammer at a second position and including features sensible by a sensor according to various embodiments described herein.
Figure 11B:
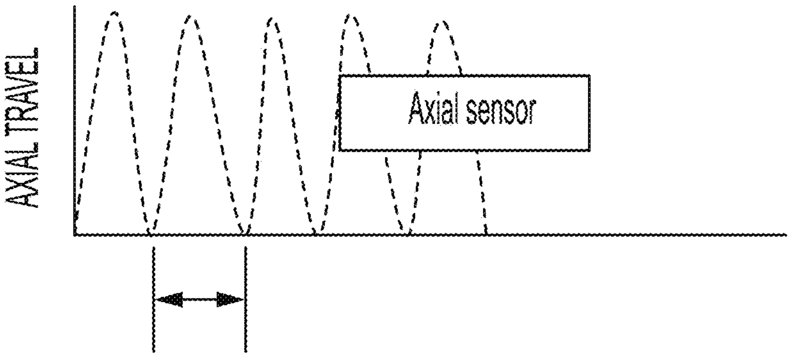
FIG. 11B illustrates a sensor signal output waveform related to axial motion of the hammer of FIG. 11A.
Figure 11C:
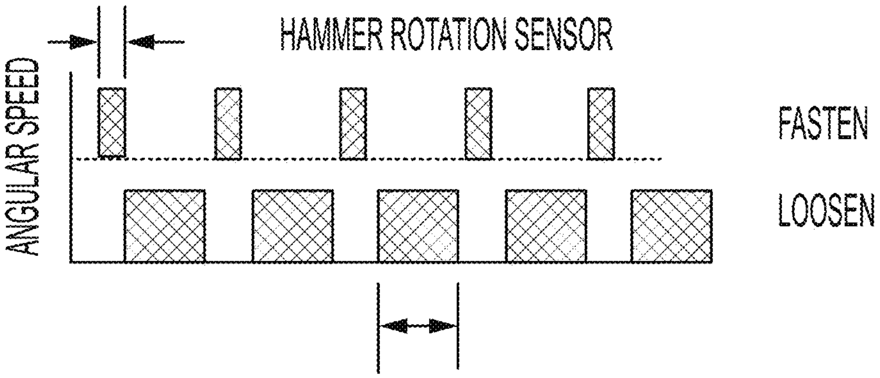
FIG. 11C illustrates sensor signal output waveforms related to a fastening operation and a loosening operation of the hammer of FIG. 11A.

The sensing of the axial and rotational position of the hammer 400 is illustrated in FIGS. 10A, 10B, and 10C with respect to the hammer being distant from the anvil 170 and PCB 405 (e.g., subsequent to an impact with the anvil 170). The sensing of the axial and rotational position of the hammer 400 is illustrated in FIGS. 11A, 11B, and 11C with respect to the hammer being in proximity to the anvil 170 and PCB 405 (e.g., as the hammer 400 is about to impact the anvil 170). With reference to FIG. 10A, because the hammer 400 is distant from the anvil 170 and PCB 405, the sensor 410 does not detect the rotational position of the hammer 400. The non-detection of the rotational position of the hammer 400 is illustrated in FIG. 10C as zero-valued outputs from the sensor 410. Because no rotational position of the hammer 400 is detected, no rotational speed of rotation for the hammer 400 can be determined. The axial position of the hammer 400 can be detected using an axial position sensor mounted on the PCB 405, which detects a distance of the hammer 400 from the PCB 405, or using the sensor 415. In some embodiments, both an axial sensor mounted on the PCB 405 and the sensor 415 can be used to measure the axial position of the hammer 400. With reference to FIG. 10B, the axial position of the hammer is measured using an axial position sensor mounted on the PCB 405. When the hammer 400 is distant from the PCB 405, the sinusoidal output signal of the axial position sensor has a longer period than when the hammer 400 is in proximity to the PCB 405.

With reference to FIG. 11A, the hammer 400 is now illustrated in proximity to the PCB 405 and the anvil 170. As a result, the sinusoidal output signal of the axial position sensor has a shorter period than when the hammer 400 is distant from the PCB 405. Additionally, because the hammer 400 is in proximity to the PCB 405, the anvil 170, and the sensor 410, the sensor 410 detects the rotational position of the hammer 400. Because the sensor 410 is able to detect the rotational position of the hammer 400, the rotational speed of the hammer 400 can be determined by the controller 200. FIG. 11C illustrates the rotational speed of the hammer 400 with respect to fastening and loosening operations of the power tool 100.

Figure 12A:
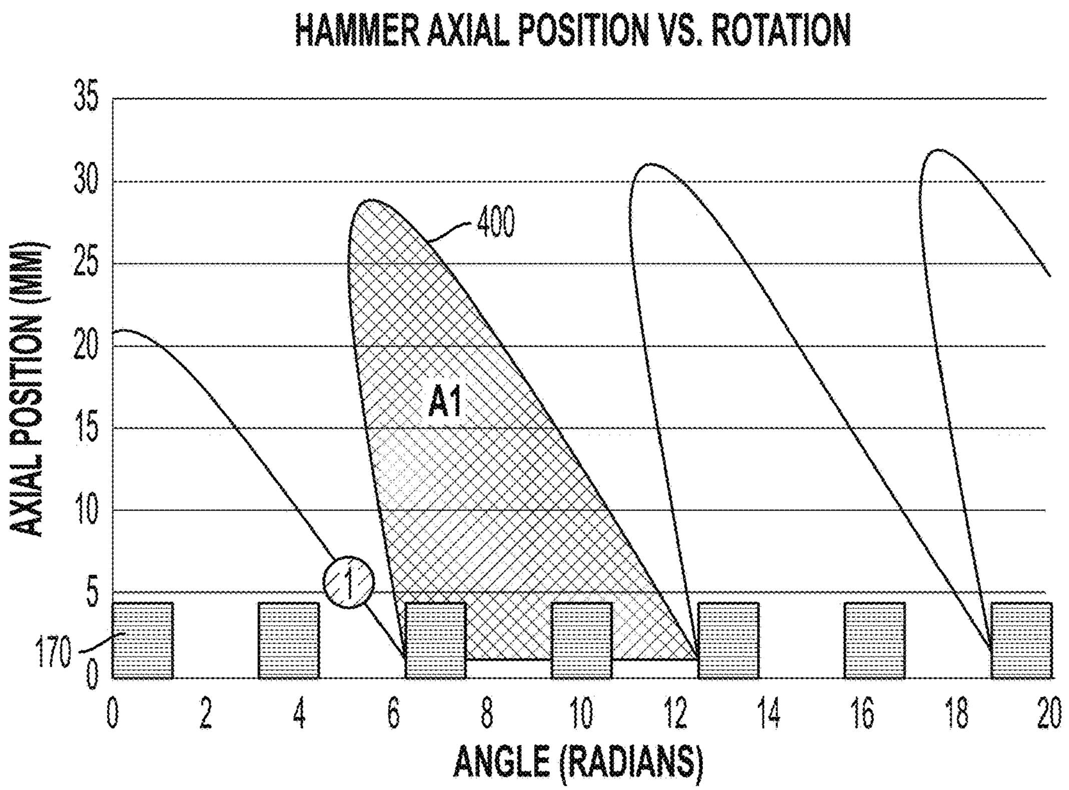
FIGS. 12A, 12B, 12C, and 12D illustrate hammer axial position with respect to hammer rotation.
Figure 12B:
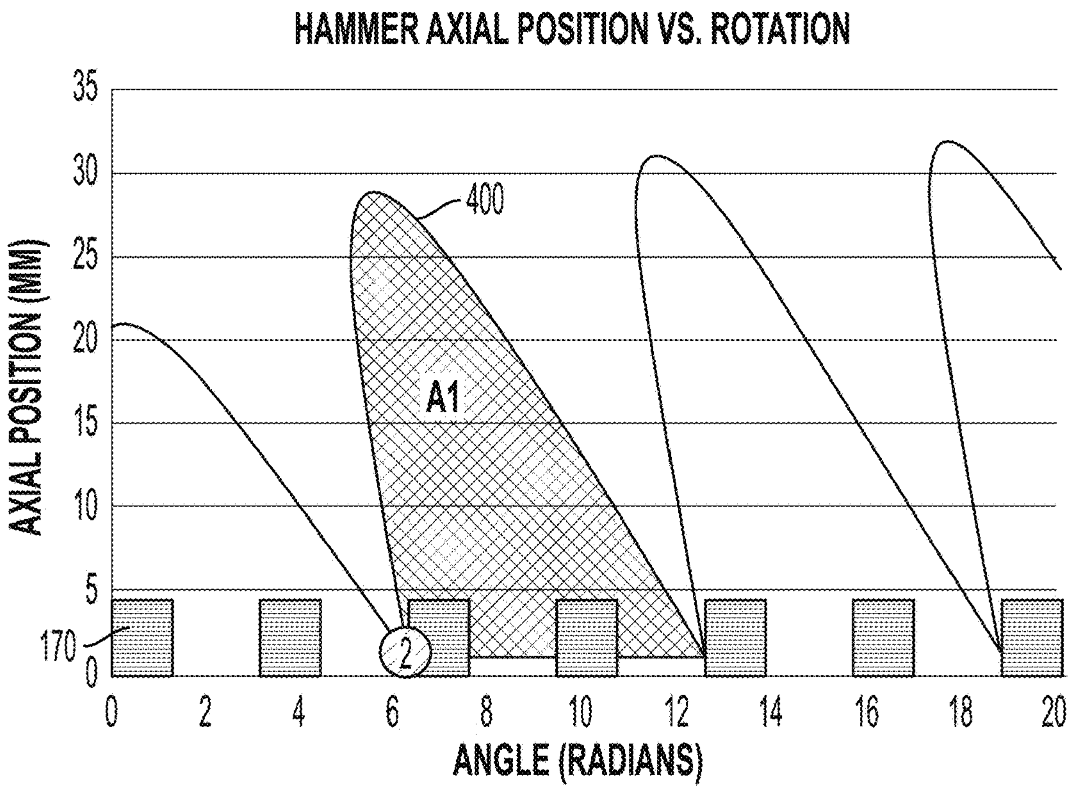
Figure 12C:
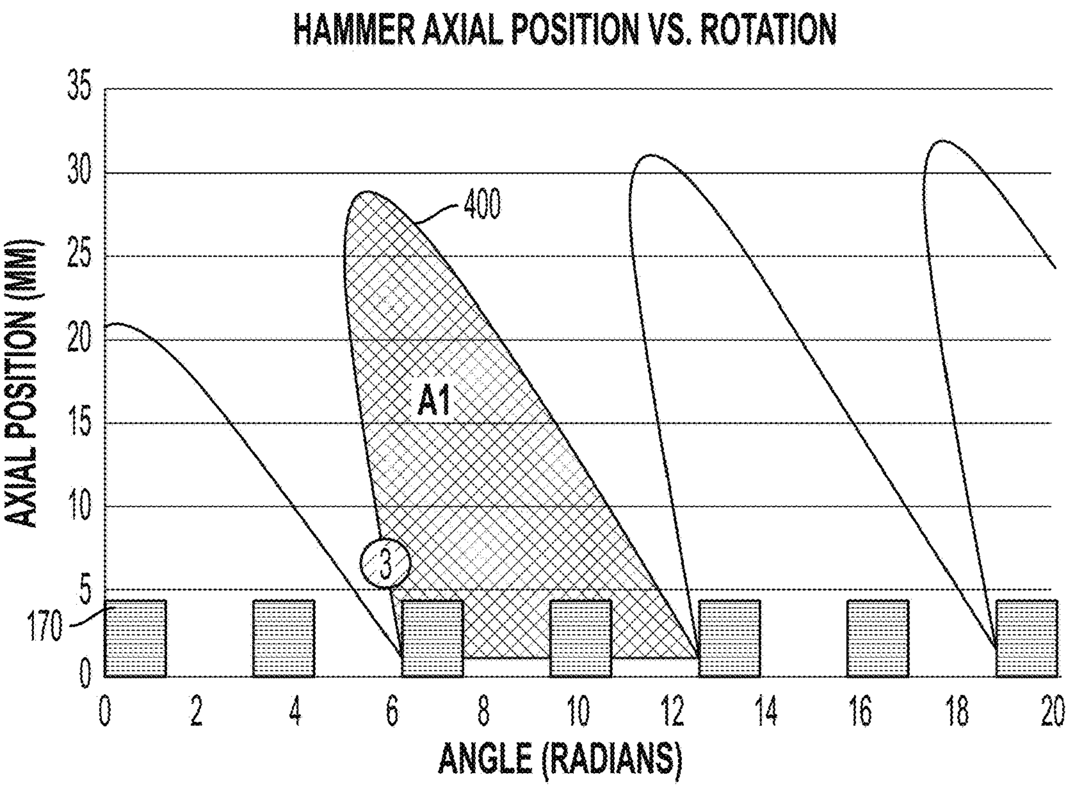
Figure 12D:
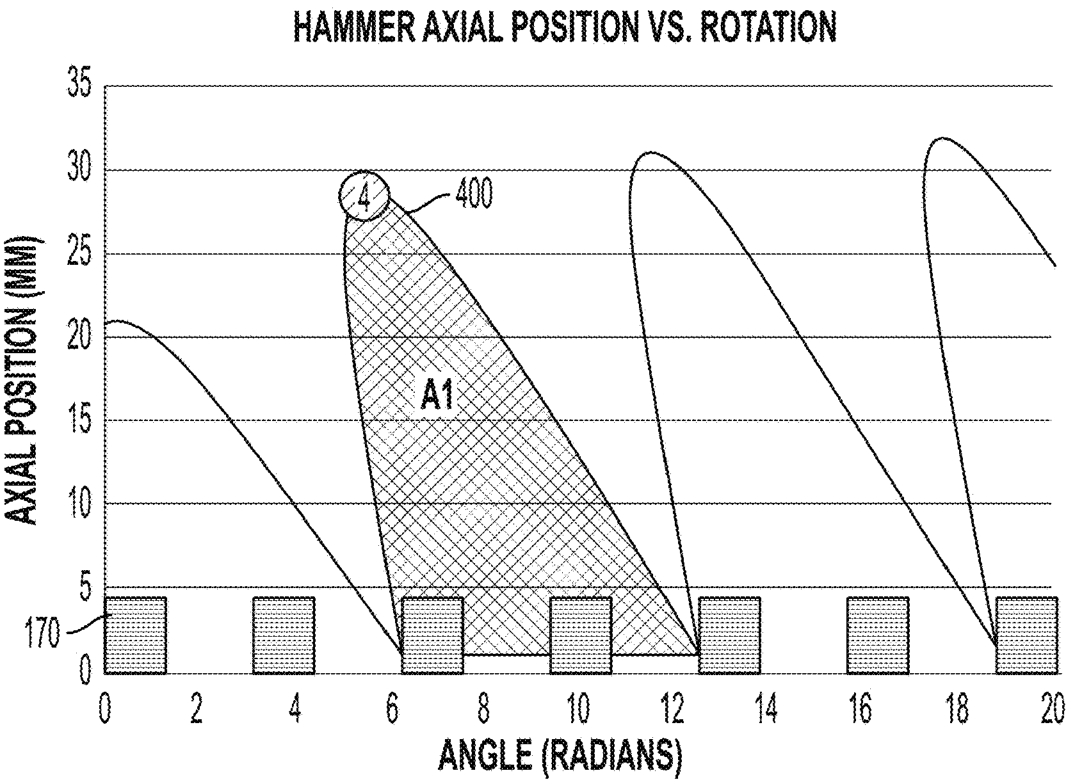

FIGS. 12A, 12B, 12C, and 12D illustrate the axial position of the hammer 400 versus the rotational position of the hammer 400. In FIG. 12A, the axial position of the hammer 400 is at POSITION 1 and the hammer 400 is approaching the anvil 170 (illustrated as a black rectangle in FIGS. 12A-12D). In FIG. 12B, the axial position of the hammer 400 is at POSITION 2 and the hammer 400 has impacted the anvil 170. In FIG. 12C, the axial position of the hammer is at POSITION 3 and the hammer 400 is rebounding away from the anvil 170. In FIG. 12D, the axial position of the hammer 400 is a maximum distance from the anvil 170 at POSITION 4, and the hammer 400 is about to begin moving back toward the anvil 170. The graphs of the axial position of the hammer 400 in FIGS. 12A-12D illustrate that the rotation of the hammer 400 is not uniform. For example, when the hammer 400 is rebounding away from the anvil 170 at POSITION 3, the hammer 400 actual rotates in an opposite direction than when the hammer 400 is approaching the anvil 170 to strike the anvil 70 (i.e., opposite to the direction of rotation of the motor 105). The hammer 400 is rotating its fastest shortly before the hammer 400 impacts the anvil 170 (see FIGS. 6B-6D above with respect to hammer 300).

The axial movement of the impact mechanism 165 is generally described with respect to the movement of the hammer 175, 300, 400 and a sensor (e.g., an inductive sensor, a magnetic sensor, etc.) detecting the axial movement of the hammer 300, 400. In other embodiments, the axial movement associated with the impact mechanism 165 can be detected based on the a component of the power tool 100 other than the hammer 300, 400 of the impact mechanism 165. For example, the compression of the spring 180 of the impact mechanism can be detected and, based on the compression of the spring 180, the axial movement of the impact mechanism 165 can be detected.

Figure 13A:
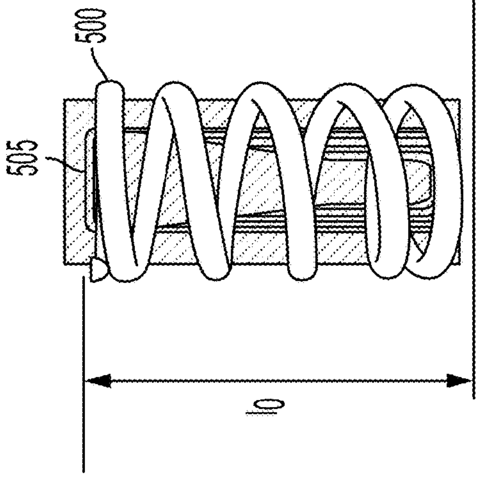
FIGS. 13A, 13B, and 13C illustrate a spring and a sensor for detecting the compression of the spring according to various embodiments described herein.
Figure 13B:
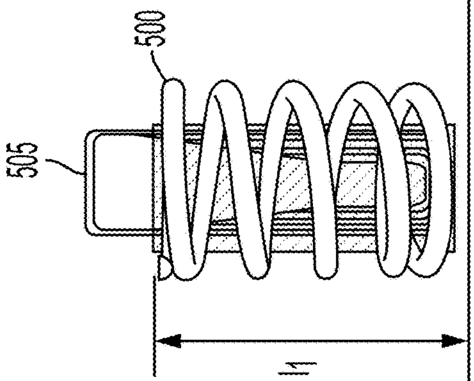
Figure 13C:
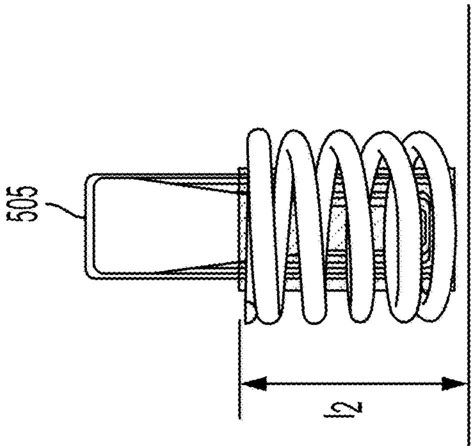

FIGS. 13A, 13B, and 13C illustrate a spring 500 and a sensor 505 associated with the spring 500. The spring 500 is shown in isolation (i.e., not assembled with the impact mechanism 165) for illustrative purposes. However, the spring 500 can be used in place of the spring 180 in the impact mechanism 165 of FIG. 3. In the illustrated embodiment, the sensor 505 is a stretch inductive sensor. The sensor 505 is approximately the same length as the spring 500 in an uncompressed state. When the sensor 505 is in proximity to the spring 500, the sensor 505 outputs a signal related to the extent to which the spring 500 traverses the length of the sensor 505. As illustrated in FIG. 13A, the spring 500 traverses approximately the entire length of the sensor 505 and outputs a first output signal corresponding to a current, $I_0$. As the spring 500 begins to be compressed prior to the hammer 175, 300, 400 moving axially forward to impact the anvil 170, the spring traverses less of the sensor 505. As a result, a second output signal corresponding to a current, $I_1$, is produced by the sensor 505. In FIG. 13C, the spring 500 is approximately fully-compressed and traverses only about half of the length of the sensor 505. In FIG. 13C, the sensor 505 produces a third output signal corresponding to a current, $I_2$. The values for the first, second, and third output signals $I_0$, $I_1$, and $I_2$ are affected by the density of the spring 500 coil. For example, as illustrated in FIG. 13D, there is a known relationship between coil density and the compressed length of the spring 500.

Figure 13D:
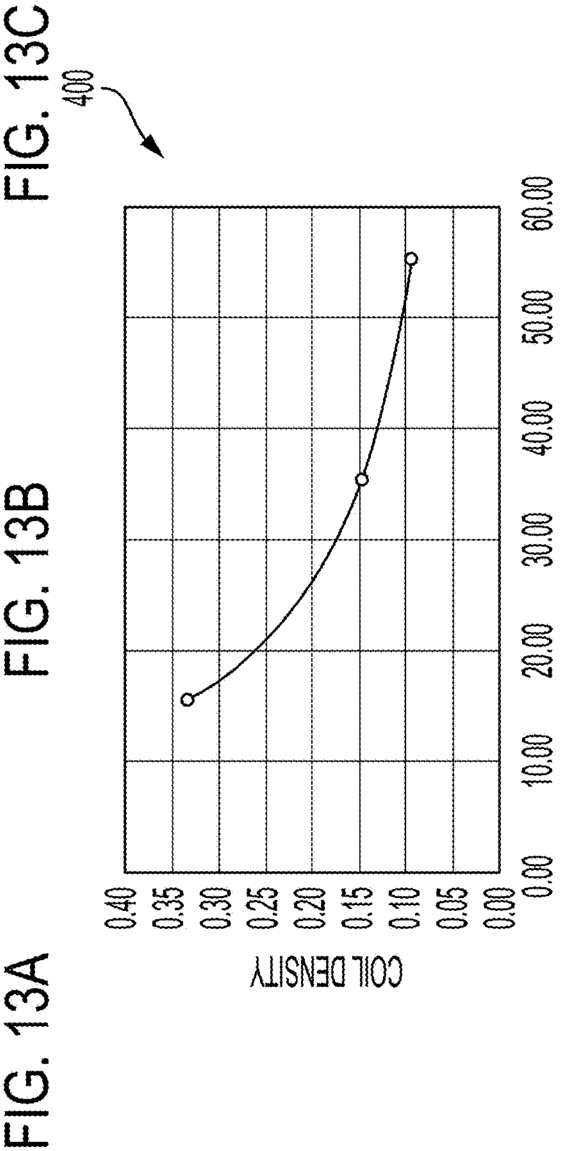
FIG. 13D is a graph of coil density versus length for the spring of FIGS. 13A, 13B, and 13C.

The relationship illustrated in FIG. 13D can be used by the controller 200 to associate the output signals from the sensor 505 to a length of the spring 500. When the controller 200 knows the length of the spring 500, the controller can determine an amount of compression of the spring 500. The amount of compression of the spring 500 then corresponds to the axial movement of the hammer 300, 400. By monitoring the compression of the spring 500, the controller 200 can then determine, for example, when an impact between the hammer 300, 400 and the anvil 170 has occurred or when an impact between the hammer 300, 400 and the anvil 170 is about to occur. For example, the controller 200 can determine that an impact has occurred based on the direction of axial displacement of the spring 500 (e.g., the spring 500 transitions from expanding to compressing). By precisely determining the axial position of the hammer 300, 400, the controller 200 is able to control the timing of when the hammer 300, 400 impacts the anvil 170. As a result, the controller 200 can ensure that the rotational speed of the hammer 300, 400 is at a maximum value immediately prior to the hammer 300, 400 impacting the anvil 170. For example, the axial position of the hammer 300, 400 can be used by the controller 200 to determine an amount of kinetic energy in the hammer 300, 400 during an impact with the anvil 170. If the speed of the hammer 300, 400 is too high, power to the motor 105 can be modified (e.g., decreased or increased) to ensure that a target amount of rebound is achieved for subsequent impact events. In some embodiments, such control can increase the forces experienced by components of the power tool 100 (e.g., cam balls, cam shaft, hammer, gearing, etc.), which can then be considered when evaluating stresses experienced by components of the power tool 100.

Figure 14A:
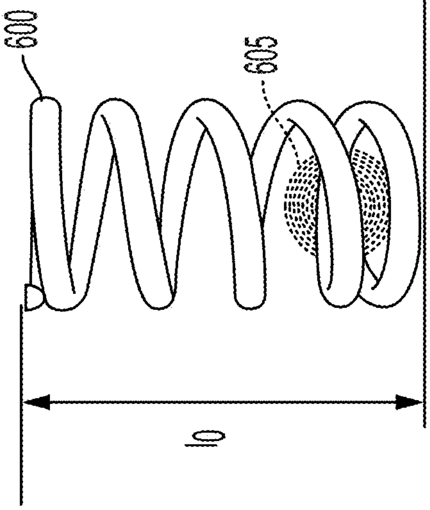
FIGS. 14A, 14B, and 14C illustrate a spring and a sensor for detecting the compression of the spring according to various embodiments described herein.
Figure 14B:
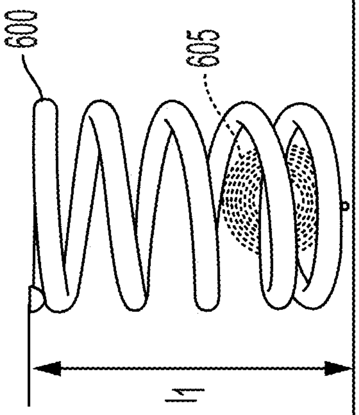
Figure 14C:
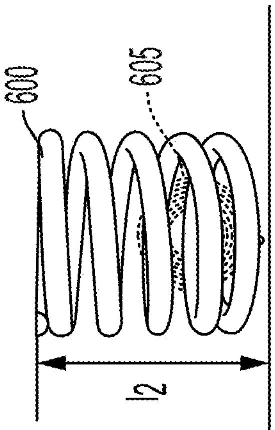

FIGS. 14A, 14B, and 14C illustrate an alternative implementation of the spring 500 and sensor 505 from FIGS. 13A-13C. In FIGS. 14A, 14B, and 14C, a spring 600 has it's compression detected by a inductive coil sensor 605. Like the spring 500, the spring 600 can be used in place of the spring 180 in the impact mechanism 165 of FIG. 3. The sensor 605 is positioned near the base of the spring 600 to detect the changes in the spring 600's compression as the hammer 300, 400 would be drawn back toward the transmission 195. Similar to the sensor 505, the sensor 605 generates output signals based on the compression of the spring 600. As the spring 600 is compressed and the coil density of the spring 600 changes, the output signals generated by the sensor 605 vary. For example, in the uncompressed state of FIG. 14A, the sensor 605 generates a first output signal, $I_0$. In a partially-compressed state as shown in FIG. 14B, the sensor 605 generates a second output signal, $I_1$. In a fully-compressed state as shown in FIG. 14C, the sensor 605 outputs a third signal, $I_2$. The output signals from the sensor 605 are correlated by the controller 200 to a length of the spring 600. When the controller 200 knows the length of the spring 600, the controller 200 can determine the axial movement of the hammer 300, 400. By monitoring the compression of the spring 600, the controller 200 can then determine, for example, when an impact between the hammer 300, 400 and the anvil 170 has occurred or when an impact between the hammer 300, 400 and the anvil 170 is about to occur. In some embodiments, if the parameters (spring preload, spring rate, etc.) of the spring 600 and travel distance of the hammer 300, 400 are known by the controller 200, the force exerted by the spring 600 can be calculated by the controller 200. The force exerted by the spring 600 permits the controller 200 to determine the potential energy stored in the spring 600, which enables more precise control of the kinetic energy of the hammer 300, 400.

For example, the controller 200 can determine that an impact has occurred based on the direction of axial displacement of the spring 600 (e.g., the spring 600 transitions from expanding to compressing). By precisely determining the axial position of the hammer 300, 400, the controller 200 is able to control the timing of when the hammer 300, 400 impacts the anvil 170. As a result, the controller 200 can ensure that the rotational speed of the hammer 300, 400 is at a maximum value immediately prior to the hammer 300, 400 impacting the anvil 170.

Figure 15A:
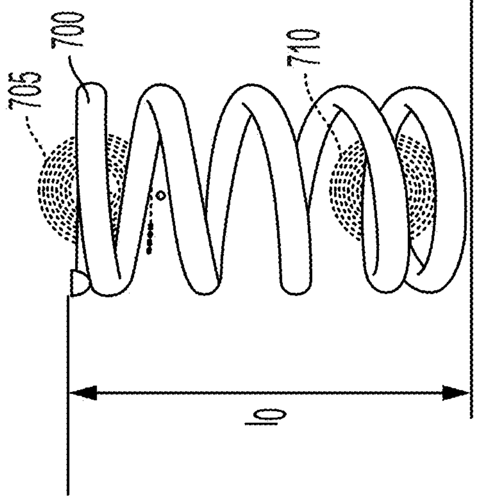
FIGS. 15A, 15B, and 15C illustrate a spring and a plurality of sensors for detecting the compression of the spring according to various embodiments described herein.
Figure 15B:
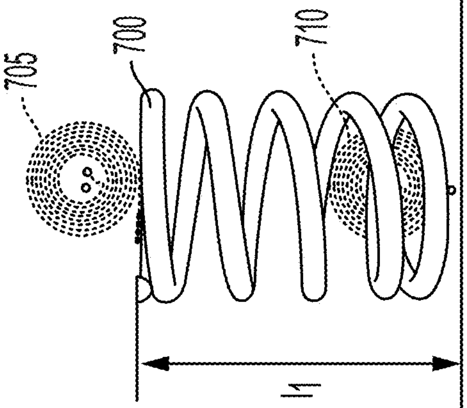
Figure 15C:
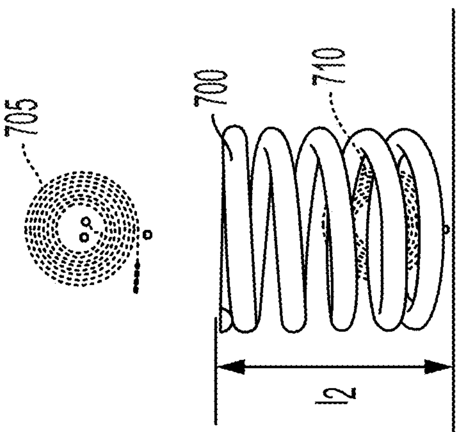

FIGS. 15A, 15B, and 15C illustrate an alternative embodiment to the spring and sensor implementation of FIGS. 14A, 14B, and 14C. In FIGS. 15A, 15B, and 15C, a spring 700 has its compressed detected by a first sensor 705 and a second sensor 710. Like the springs 500, 600, the spring 700 can be used in place of the spring 180 in the impact mechanism 165 of FIG. 3. The sensor 710 outputs signals that are substantially similar to the output signals from the sensor 605 described above with respect to FIGS. 14A, 14B, and 14C. The sensor 705 generates an output signal that differs from the signal generated by the sensor 710. The output signals generated by the sensors 705 and 710 can be used in combination by the controller 200 to determine, for example, when the spring 700 is fully-compressed or fully-uncompressed. As with, for example, the sensor 605 of FIGS. 14A, 14B, and 14C, the output signals from the sensors 705, 710 are correlated by the controller 200 to a length of the spring 700. When the controller 200 knows the length of the spring 700, the controller 200 can determine the axial movement of the hammer 300, 400. By monitoring the compression of the spring 700, the controller 200 can then determine, for example, when an impact between the hammer 300, 400 and the anvil 170 has occurred or when an impact between the hammer 300, 400 and the anvil 170 is about to occur. For example, the controller 200 can determine that an impact has occurred based on the direction of axial displacement of the spring 700 (e.g., the spring 700 transitions from expanding to compressing). By precisely determining the axial position of the hammer 300, 400, the controller 200 is able to control the timing of when the hammer 300, 400 impacts the anvil 170. As a result, the controller 200 can ensure that the rotational speed of the hammer 300, 400 is at a maximum value immediately prior to the hammer 300, 400 impacting the anvil 170.

Figures 16A, 16B, 16C, 17A, 17B, 17C:
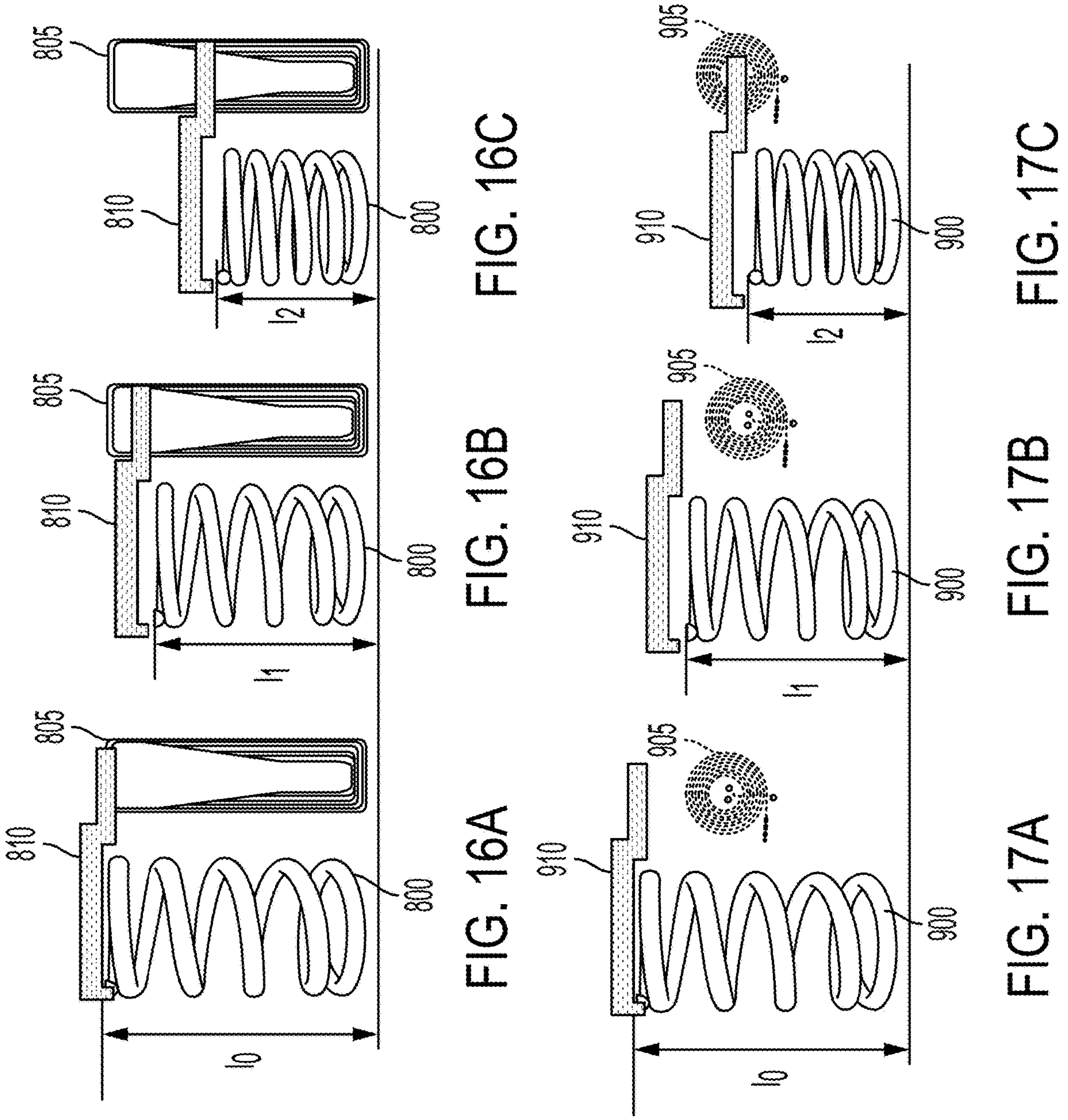
FIGS. 16A, 16B, and 16C illustrate a spring including a conductive member and a sensor for detecting the compression of the spring according to various embodiments described herein.
FIGS. 17A, 17B, and 17C illustrate a spring including a conductive member and a sensor for detecting the compression of the spring according to various embodiments described herein.

FIGS. 16A, 16B, and 16C illustrate a spring 800 and a sensor 805. The embodiment of FIGS. 16A, 16B, and 16C, differs from the embodiment of, for example, FIGS. 13A, 13B, and 13C in that the spring 800 has attached to it a conductor 810. Like the springs 500, 600, and 700, the spring 800 can be used in place of the spring 180 in the impact mechanism 165 of FIG. 3. The conductor 810 extends away from the spring 800 such that it partially covers a portion of the sensor 805. The sensor 805 is a stretch inductive sensor. Depending upon where the conductor 810 covers the sensor 805, an output signal generated by the sensor 805 will vary. The output signals generated by the sensor 805 corresponding to the conductor 810 covering different portions of the sensor 805 can be stored in the memory 255 of the controller 200. The controller 200 can then interpret the output signals from the sensor 805 to determine a compression of the spring 800 and a length of the spring 800. When the controller 200 knows the length of the spring 800, the controller 200 can determine the axial movement of the hammer 300, 400. By monitoring the compression of the spring 800, the controller 200 can then determine, for example, when an impact between the hammer 300, 400 and the anvil 170 has occurred or when an impact between the hammer 300, 400 and the anvil 170 is about to occur. For example, the controller 200 can determine that an impact has occurred based on the direction of axial displacement of the spring 800 (e.g., the spring 800 transitions from expanding to compressing). By precisely determining the axial position of the hammer 300, 400, the controller 200 is able to control the timing of when the hammer 300, 400 impacts the anvil 170. As a result, the controller 200 can ensure that the rotational speed of the hammer 300, 400 is at a maximum value immediately prior to the hammer 300, 400 impacting the anvil 170.

FIGS. 17A, 17B, and 17C illustrate a spring 900 and a sensor 905. The spring 900 has attached to it a conductor 910. Like the springs 500, 600, 700, and 800, the spring 900 can be used in place of the spring 180 in the impact mechanism 165 of FIG. 3. The conductor 910 extends away from the spring 900 such that it may partially cover a portion of the sensor 905. The sensor 905 is a coil inductive sensor. Depending upon where the conductor 910 is in proximity to the sensor 905, an output signal generated by the sensor 905 will vary. The output signals generated by the sensor 905 corresponding to the conductor 910 being in proximity to different portions of the sensor 905 can be stored in the memory 255 of the controller 200. The controller 200 can then interpret the output signals from the sensor 905 to determine a compression of the spring 900 and a length of the spring 900. When the controller 200 knows the length of the spring 900, the controller 200 can determine the axial movement of the hammer 300, 400. By monitoring the compression of the spring 900, the controller 200 can then determine, for example, when an impact between the hammer 300, 400 and the anvil 170 has occurred or when an impact between the hammer 300, 400 and the anvil 170 is about to occur. For example, the controller 200 can determine that an impact has occurred based on the direction of axial displacement of the spring 900 (e.g., the spring 900 transitions from expanding to compressing). By precisely determining the axial position of the hammer 300, 400, the controller 200 is able to control the timing of when the hammer 300, 400 impacts the anvil 170. As a result, the controller 200 can ensure that the rotational speed of the hammer 300, 400 is at a maximum value immediately prior to the hammer 300, 400 impacting the anvil 170.

In addition to detecting rotational position of a hammer 300, 400, the axial position of the hammer 300, 400, and the compression of a spring 500, 600, 700, 800, 900, the one or more position sensors 220 can also be used to detect the movement of other components commonly found within power tools. For example, as illustrated in FIG. 18A, a cam 1000 is configured to rotate about an axis 1005. The rotation of the cam 1000 can be detected by a sensor 1010 and monitored by the controller 200 as the cam 1000 rotates. For example, in FIGS. 18B, 18C, and 18D, the sensor 1010 is a stretch inductive sensor. As the cam 1000 rotates, the cam 1000 covers a portion of the sensor 1010. As a result of the asymmetric shape of the cam 1000, an output signal from the sensor 1010 varies depending upon an amount of rotation of the cam 1000. Accordingly, the controller 200 is able to correlate a value for an output signal from the sensor 1010 to an amount of rotation of the cam 1000.

Figure 19C:
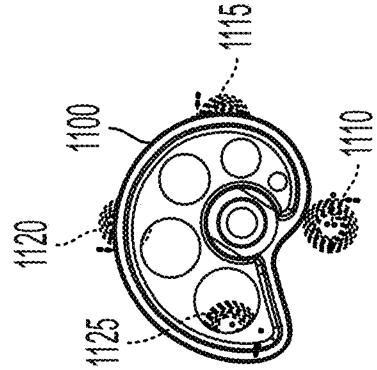
FIGS. 19B, 19C, and 19D illustrate the cam of FIG. 19A and a plurality of sensors for detecting rotation of the cam according to various embodiments described herein.
Figure 19B:
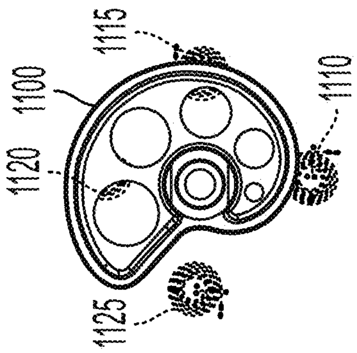
Figure 19D:
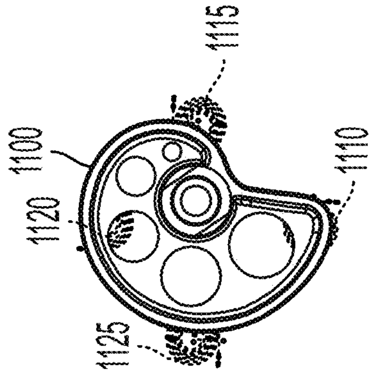
Figure 19A:
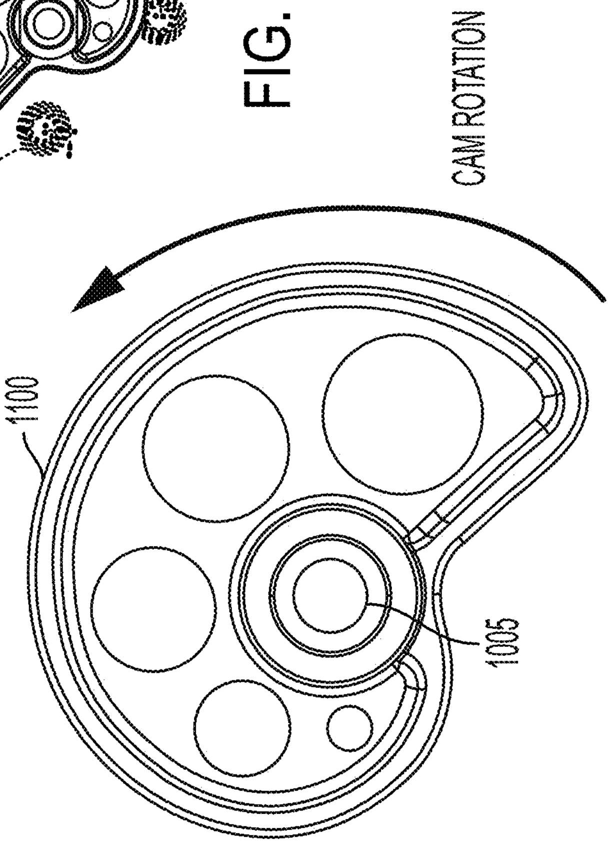
FIG. 19A illustrates a rotatable cam.

FIG. 19A illustrates a cam 1100 that is configured to rotate about an axis 1105. As shown in FIGS. 19B, 19C, and 19D, the rotation of the cam 1100 about the axis 1105 can be detected by sensors 1110, 1115, 1120, and 1125 and monitored by the controller 200 as the cam 1100 rotates. For example, in FIGS. 19B, 19C, and 19D, the sensors 1110, 1115, 1120, and 1125 are coil inductive sensors. As the cam 1100 rotates, the cam 1100 may partially or entirely cover portions of the sensors 1110, 1115, 1120, and 1125. As a result of the asymmetric shape of the cam 1100, output signals from the sensors 1110, 1115, 1120, and 1125 vary depending upon an amount of rotation of the cam 1100. Accordingly, the controller 200 is able to correlate the values for the output signals from the sensors 1110, 1115, 1120, and 1125 to an amount of rotation of the cam 1100.

Figure 20A:
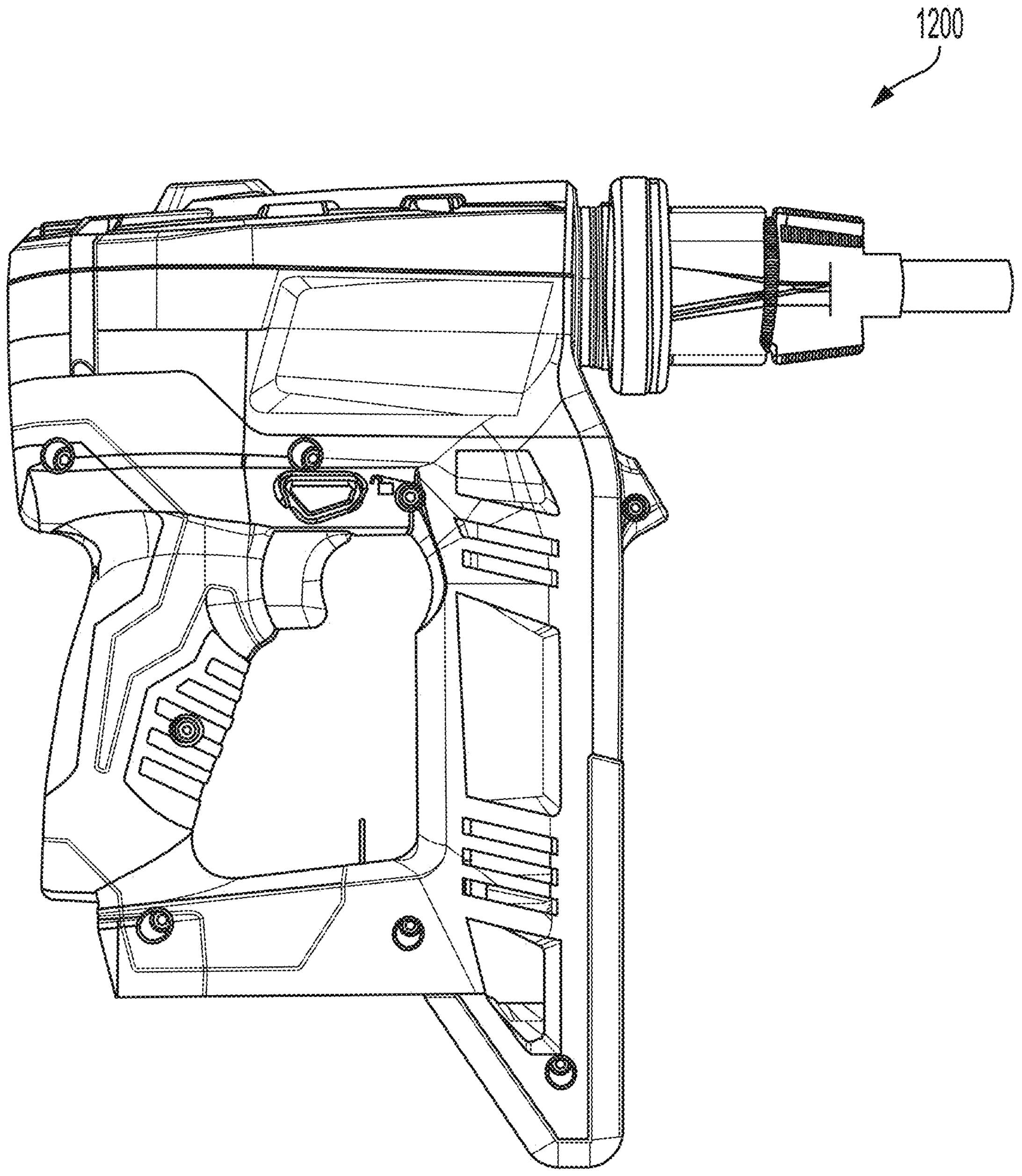
FIGS. 20A and 20B illustrates a PEX pipe expander including a position sensor according to various embodiments described herein.
Figure 20B:
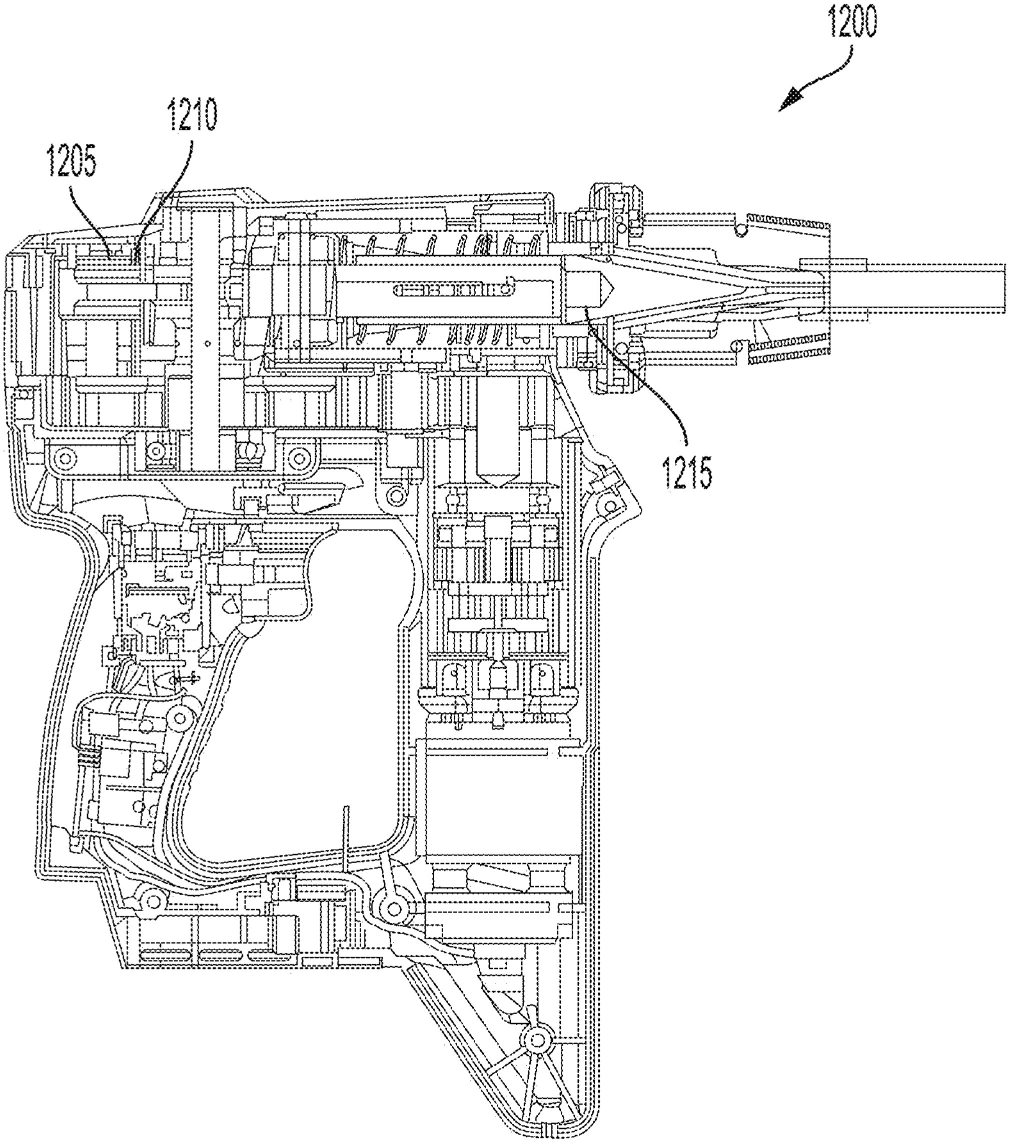

FIGS. 20A and 20B illustrate a particular embodiment of a power tool 1200 that includes one or more position sensors 1205. The power tool 1200 is a PEX pipe expander that is configured to expand, for example, up to 1½-inch PEX pipe. The power tool 1200 operates based on the rotation of a cam 1210. As the cam 1210 rotates, a ram 1215 moves linearly. The one or more position sensors 1205 are located in an upper portion of the power tool 1200 (e.g., above the ram 1215) and in proximity to the cam 1210. As a result, the one or more position sensors 1205, such as the position sensors described with respect to FIGS. 18A-18D or 19A-119D, can be used to detect the rotational motion of the cam 1210. The position of the cam 1210 dictates how much mechanical advantage is created in the power tool 1200. If, for example, current drawn by the power tool 1200's motor exceeds a predetermined limit for a given position of the cam 1210, the power tool 1200 may require service (e.g., the power tool 1200 is damaged, is operating at an unacceptable temperature, etc.).

Figure 21A:
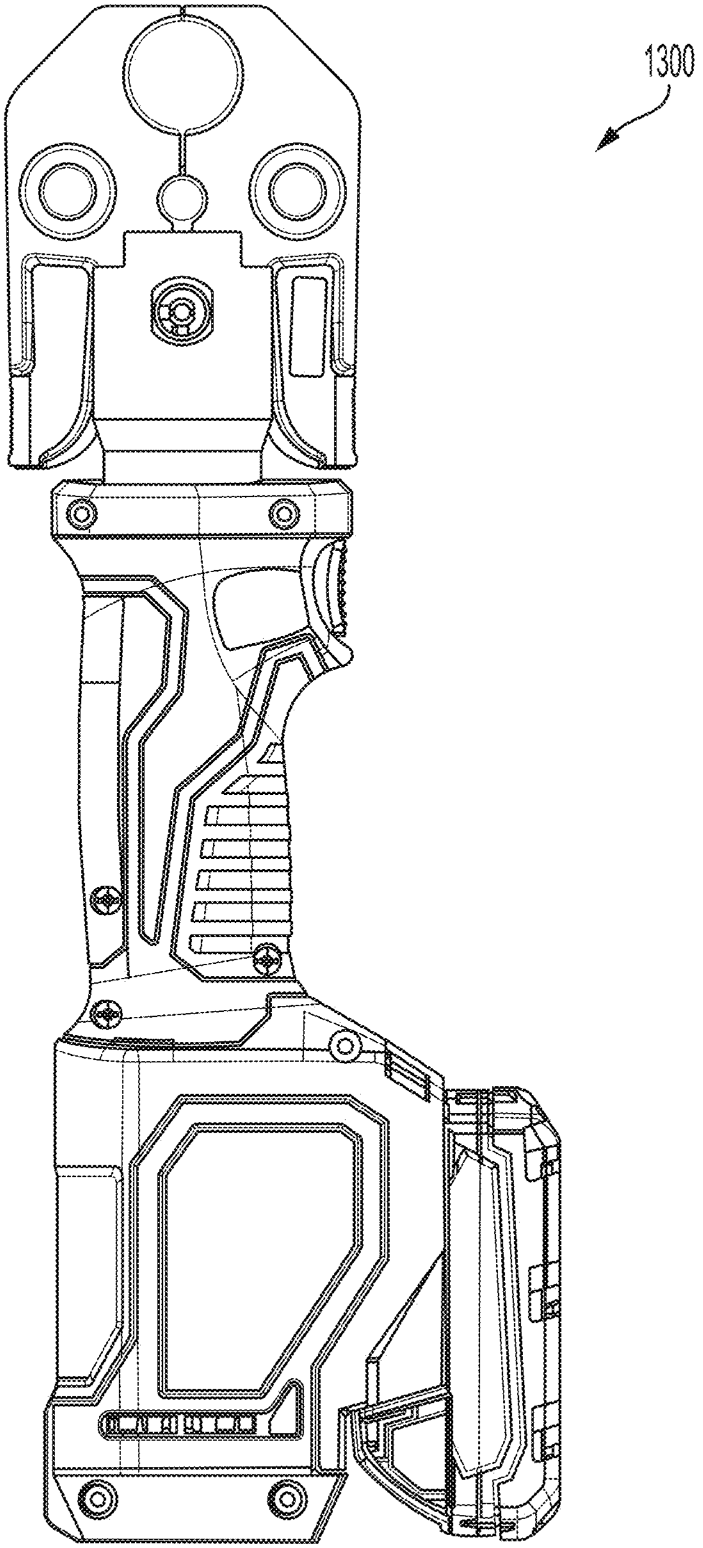
FIGS. 21A and 21B illustrate a crimper including a position sensor according to various embodiments described herein.
Figure 21B:
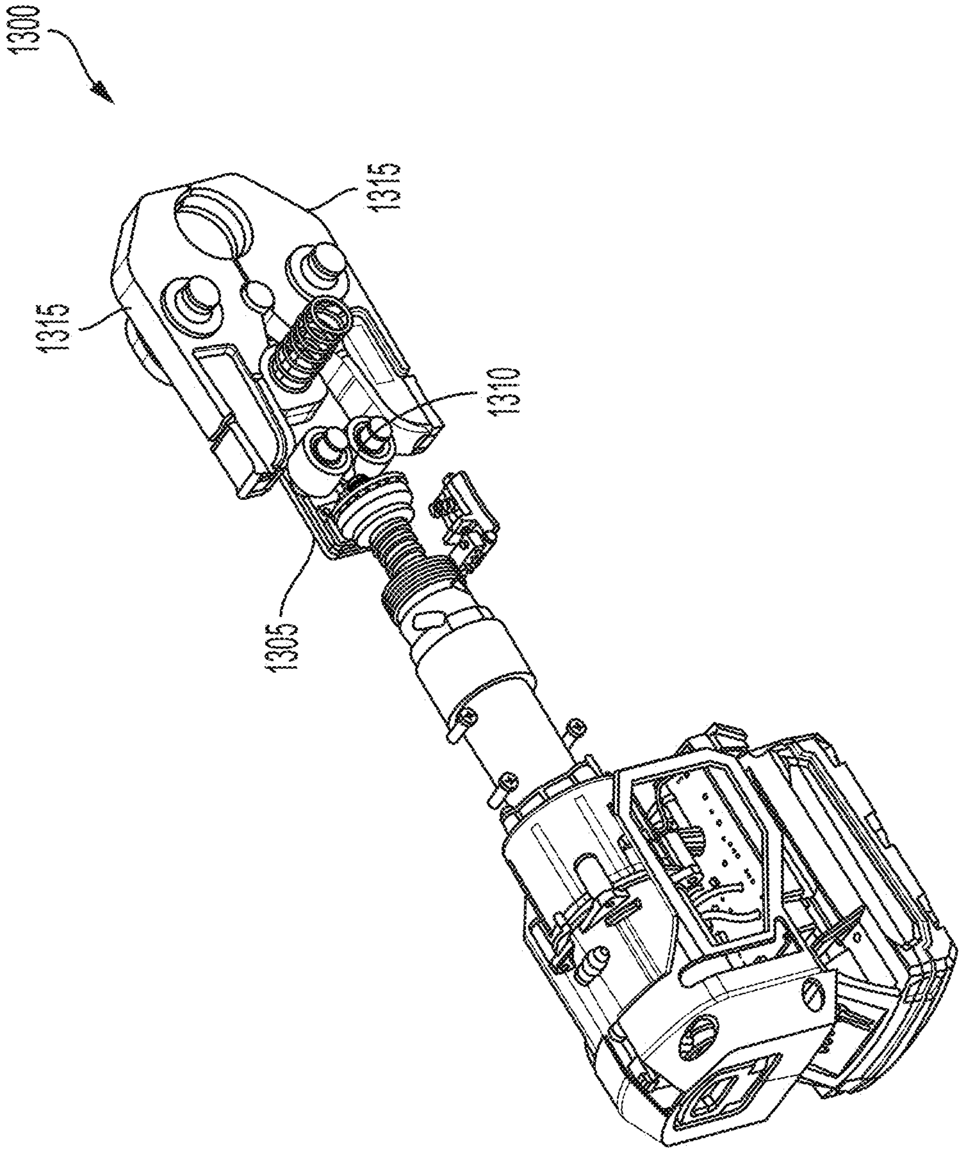

FIGS. 21A and 21B illustrate a particular embodiment of a power tool 1300 that includes one or more position sensors 1305. The power tool 1300 is a crimper. The power tool 1300 operates based on the linear movement of a piston 1310. As the piston 1310 moves linearly, the piston 1310 opens and closes jaws 1315. The one or more position sensors 1305 are positioned in a forward or front portion of the power tool 1300 (e.g., near the jaws 1315) and in proximity to a forward or front end of the piston 1310. As a result, the one or more position sensors 1305, such as the position sensors described with respect to FIGS. 13A-13C, 14A-14C, 15A-15C, 16A-16C, or 17A-17C, can be used to detect the linear motion of the piston 1310.

Figure 22A:
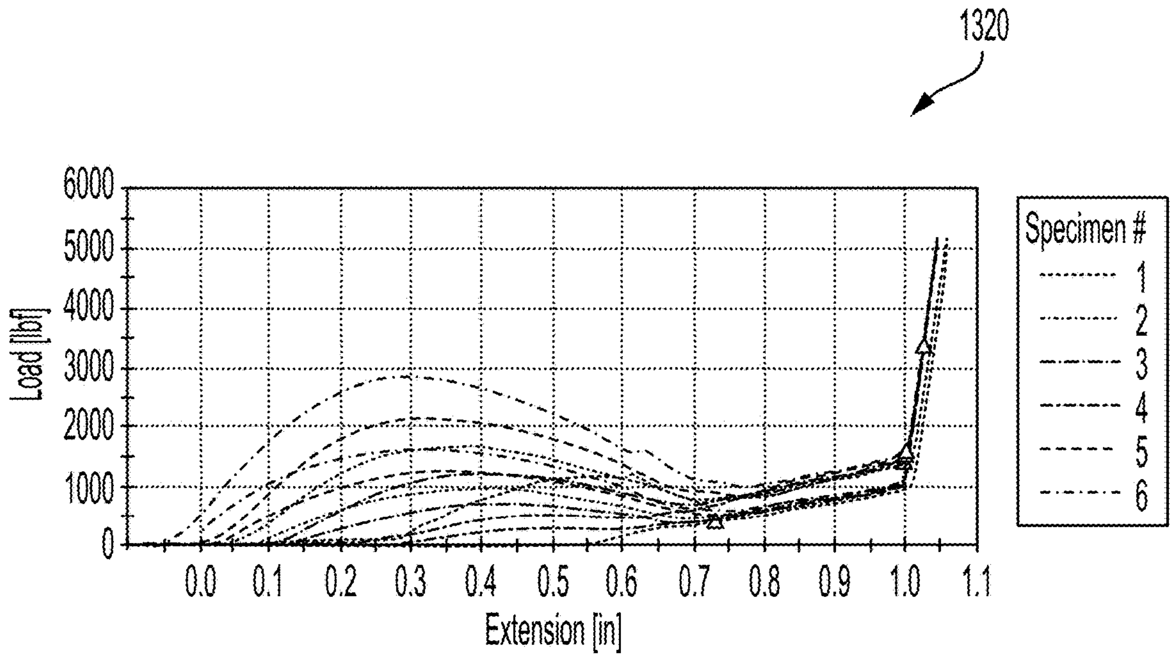
FIGS. 22A and 22B illustrate linear displacement of a crimper piston with respect to force required complete a crimping action.

For example, FIG. 22A illustrates a graph 1320 showing an amount of force the power tool 1300 must apply to a jaw mechanism to successfully crimp an object (e.g., a plumbing fitting). The power tool 1300*s* jaw mechanism exerts relatively low force between approximately 0.0 and 0.8 inches of piston displacement. The gradual increase and then reduction in load represents the elastic and plastic deformation of the object as it is secured by the power tool 1300. The force required for a successful crimp depends on, for example, the tolerances of the jaws 1315, environmental temperature, and particular application.

Figure 22B:
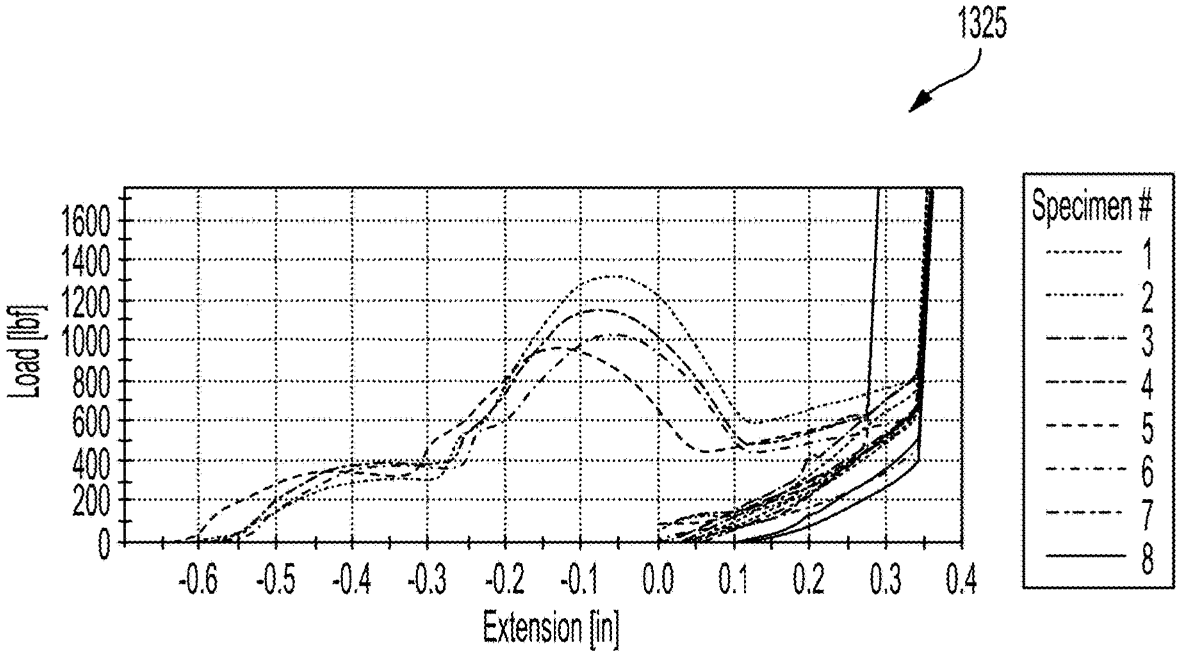

The load profile is different when there is not object to be crimped between the jaws 1315 because the jaws 1315 begin in a closed position (i.e., rather than being biased open) and force is applied by the jaw mechanism later in the travel of the piston 1310. FIG. 22B illustrates a graph 1325 for an object (e.g., a plumbing fitting) having a different diameter than the object from FIG. 22A. The forces exerted by the power tool 1300 in FIG. 22B are lower than in FIG. 22A, but the power tool 1300 eventually reaches a full travel condition. To prevent damage to the power tool 1300 at full travel, hard stops of the piston 1310 are used. When a hard stop is reached, the force exerted by the power tool 1300 increases rapidly and is more force than is required to complete a crimping action. The one or more position sensors 1305 can provide the controller 200 with a continuous signal related to the displacement of the piston 1310 and to indicate when a hard stop has been reached. As a result, the one or more position sensors 1305 (e.g., inductive sensors) can be used in place of magnetic sensors. The magnets used with magnetic sensors can attract stray pieces of metal that can damage Hall sensors. Additionally, using the number of motor rotations to control displacement of the piston 1310 is inadequate due to overshoot and undershoot in piston stopping positions. The one or more sensors 1305 are advantageous because the actual location of the piston 1310 can be determined and an accumulation of overshoot and undershoot of the piston 1310's stopping position can be avoided.

Figure 23:
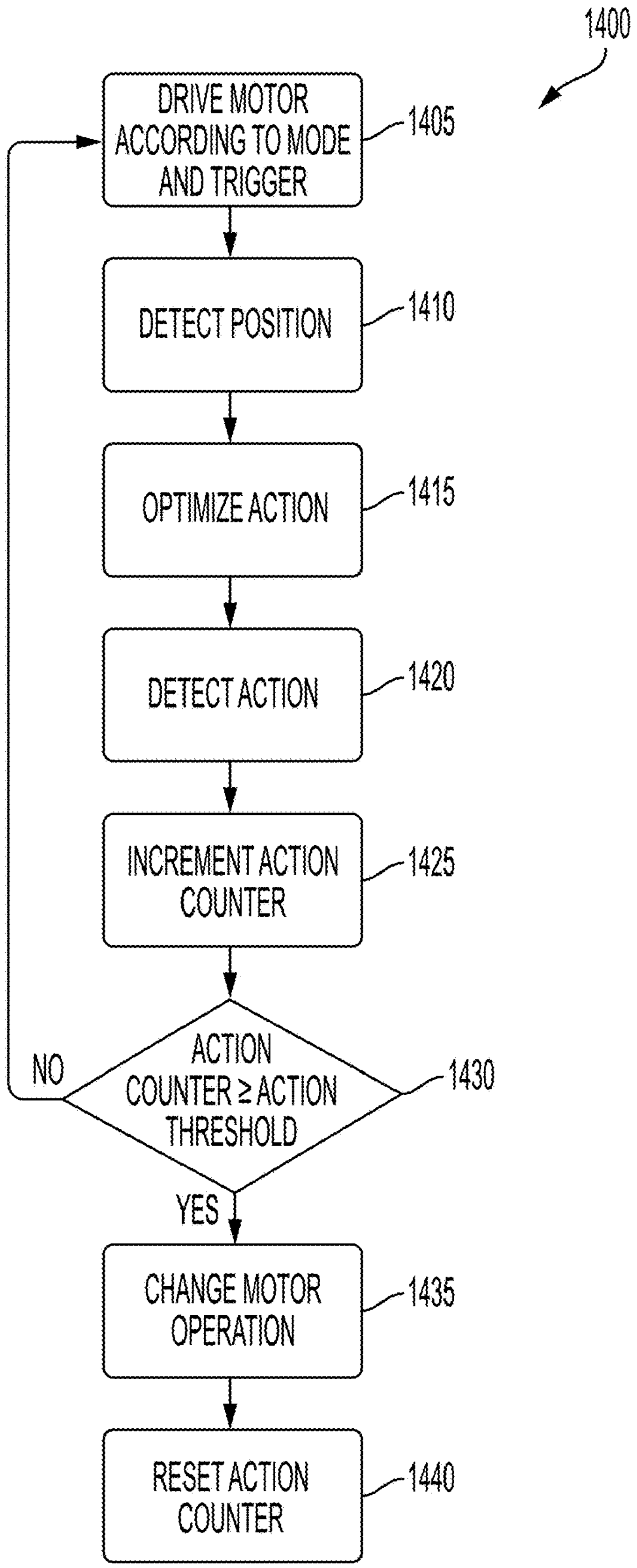
FIG. 23 is a process for controlling the operation of a power tool.

FIG. 23 is a process 1400 related to the operation of the power tool 100, the power tool 1200, or the power tool 1300. The process 1400 generally relates to an operation mode of the power tool 100, 1200, 1300 where the power tool 100, 1200, 1300 is controlled based on a detected action or number of actions. For example, the action could be a hammer action during which the hammer 300, 400 impacts the anvil 170. In some embodiments, the action is the rotation of a cam 1210 (see FIG. 20B). In other embodiments, the action is the extension of the piston 1310 (see FIG. 21B). Each action by the power tool 100, 1200, 1300 is initiated by the activation of a trigger switch for driving a motor. For example, with specific reference to the power tool 100, the controller 200 drives the motor 105 according to a selected mode (e.g., fasten or loosen) and a detected pull of the trigger 150 (STEP 1405). The controller 200 also detects the position of, for example, the hammer 300, 400 using the one or more position sensors 220 (STEP 1410). Based on the detected position of the hammer 300, 400 using the one or more position sensors 220, the controller 200 optimizes the action or impact between the hammer 300, 400 and the anvil 170 (e.g., to maximize energy transfer between the hammer 300, 400 and the anvil 170) (STEP 1415).

The controller 200 then detects an action (e.g., the hammer 300, 400 impacting the anvil 170) (STEP 1420). The controller 200 detects the action by, for example, detecting and monitoring a rotational and/or axial position of the hammer 300, 400. When the hammer 300, 400 has rotated a predetermined distance or moved in the axial direction a predetermined distance indicative of the distance required for the hammer 300, 400 to impact the anvil 170, the controller 200 increments an action counter by one (STEP 1425). In some embodiments, the controller 200 optimizes the action after detecting the action and STEP 1415 and STEP 1420 can be interchanged within the process 1400. The controller 200 then determines if the action counter is greater than or equal to an action threshold (STEP 1430). The action threshold is indicative of the user-specified number of actions to be performed (e.g., for a fastener to be tightened). If the action counter is not greater than the action threshold, the controller 200 continues to operate the motor 105 and returns to STEP 1405. When the action counter is greater than or equal to the action threshold, the controller 200 changes the operation of the motor 105 (e.g., stops the motor 105, decreases the speed of the motor 105, increases the speed of the motor 105, etc.) (STEP 1435), and resets the action counter (STEP 1440). In some embodiments, the method of optimization is provided that bypasses STEPS 1420-1440 and, rather, returns to STEP 1405 after STEP 1415.

Thus, embodiments described herein provide, among other things, techniques for detecting or determining a position of a component in a power tool and controlling the operation of the power tool based on the detected or determined position of the component. Various features and advantages are set forth in the following claims.

What is claimed is:

1. A power tool comprising:

a motor;

an impact mechanism coupled to the motor, the impact mechanism including:

a hammer driven by the motor, the hammer including a first sensible feature and a second sensible feature, an anvil configured to receive an impact from the hammer, and a spring configured to axially bias the hammer to engage the anvil;

an impact case housing the anvil, the hammer, and the spring;

a sensor configured to generate an output signal indicative of a compression of the spring; and a processing unit connected to the sensor and to the motor, the processing unit configured to control the motor based on the output signal from sensor.

2. The power tool of claim 1, wherein:

the output signal from the sensor corresponds to an axial position of the hammer; and the processing unit is configured to determine the axial position of the hammer based on the output signal from the sensor.

3. The power tool of claim 1, wherein the sensor is an inductive sensor configured to generate the output signal indicative of the compression of the spring.

4. The power tool of claim 3, wherein the inductive sensor is a stretch inductive sensor.

5. The power tool of claim 3, wherein the inductive sensor is a coil inductive sensor.

6. The power tool of claim 5, wherein the coil inductive sensor is positioned at a base of the spring.

7. The power tool of claim 6, further comprising:

a second coil inductive sensor, wherein the second coil inductive sensor is positioned at a second end of the spring opposite the base of the spring.

8. The power tool of claim 3, further comprising:

a conductor connected to the spring, wherein the conductor extends away from the spring and partially covers a portion of the inductive sensor.

9. The power tool of claim 8, wherein the inductive sensor is a stretch inductive sensor.

10. The power tool of claim 8, wherein the inductive sensor is a coil inductive sensor.

11. The power tool of claim 1, wherein the power tool is selected from the group consisting of: impact wrench, an impact driver, a hammer drill, an impact hole saw, a crimper, and a PEX pipe expander.

12. A method of controlling a motor of a power tool, the power tool including a mechanism and a spring, the method comprising:

sensing, with a sensor, a compression of the spring;

generating an output signal from the sensor indicative of the compression of the spring, the compression of the spring related to a state of the mechanism;

receiving the output signal at a processing unit; and controlling, using the processing unit, the motor of the power tool based on the output signal indicative of the compression of the spring.

13. The method of claim 12, wherein the output signal from the sensor corresponds to an axial position of the mechanism.

14. The method of claim 12, wherein the sensor is an inductive sensor.

15. The method of claim 14, wherein the inductive sensor is a stretch inductive sensor.

16. The method of claim 14, wherein the inductive sensor is a coil inductive sensor.

17. The method of claim 16, further comprising:

sensing, with a second coil inductive sensor, the compression of the spring;

generating a second output signal from the second coil inductive sensor indicative of the compression of the spring; and receiving the second output signal at the processing unit; and controlling, using the processing unit, the motor of the power tool based on the second output signal indicative of the compression of the spring.

18. The method of claim 17, wherein the power tool is selected from the group consisting of: impact wrench, an impact driver, a hammer drill, an impact hole saw, a crimper, and a PEX pipe expander.

19. A power tool comprising:

a motor;

an impact mechanism coupled to the motor, the impact mechanism including:

a hammer driven by the motor, the hammer including a first sensible feature and a second sensible feature, an anvil configured to receive an impact from the hammer, and a spring configured to axially bias the hammer;

a sensor configured to generate an output signal indicative of a compression of the spring; and a processing unit connected to the sensor, the processing unit configured to detect the impact between the hammer and the anvil based on the output signal from the sensor.

20. The power tool of claim 19, wherein the output signal from the sensor corresponds to an axial displacement of the spring.

* * * * *